United States Patent [19]
Blatz et al.

[11] Patent Number: 5,130,076
[45] Date of Patent: Jul. 14, 1992

[54] DIRECT FABRICATION

[75] Inventors: Philip S. Blatz, Wilmington; Paul N. Richardson, Newark; Pallatheri M. Subramanian, Hockessin, all of Del.

[73] Assignee: E. I. du Pont de Nemours and Company, Wilmington, Del.

[21] Appl. No.: 655,485

[22] Filed: Feb. 14, 1991

Related U.S. Application Data

[63] Continuation-in-part of Ser. No. 575,545, Aug. 27, 1990.

[51] Int. Cl.[5] ............... B29C 45/47; B29C 45/50; B29C 45/60
[52] U.S. Cl. .................. 264/540; 264/328.17; 264/328.19; 264/331.13; 264/331.18; 264/331.19; 264/331.21; 264/537; 425/208
[58] Field of Search ............. 264/349, 211.24, 328.17, 264/328.19, 331.15, 331.19, 331.21, 537, 540, 331.13, 331.18; 425/206, 207, 208

[56] References Cited

U.S. PATENT DOCUMENTS

| | | | |
|---|---|---|---|
| 4,172,859 | 10/1979 | Epstein | 525/146 |
| 4,174,358 | 11/1979 | Epstein | 525/425 |
| 4,770,837 | 9/1988 | Lu et al. | 264/503 |
| 4,784,819 | 11/1988 | Spurr | 425/564 |
| 4,908,169 | 3/1990 | Galic et al. | 425/587 |
| 5,013,233 | 5/1991 | Semmekrot | 425/208 |
| 5,026,512 | 6/1991 | Chang | 264/331.21 |

FOREIGN PATENT DOCUMENTS 57-034936  2/1982  Japan ................. 425/208

Primary Examiner—Jan H. Silbaugh
Assistant Examiner—Catherine Timm

[57] ABSTRACT

Melt fabrication, with precompounding, of a plurality of thermoplastic resins, is provided by use of a screw having a dispersion section in such machines as injection molding machines. The minor resin component can be an elastomer, which toughens the resin's major component. This effect is improved by increasing back pressure on the screw used in the injection molding machine, to extend the screw rotation and thus shear time accomplished by the dispersion section.

16 Claims, 4 Drawing Sheets

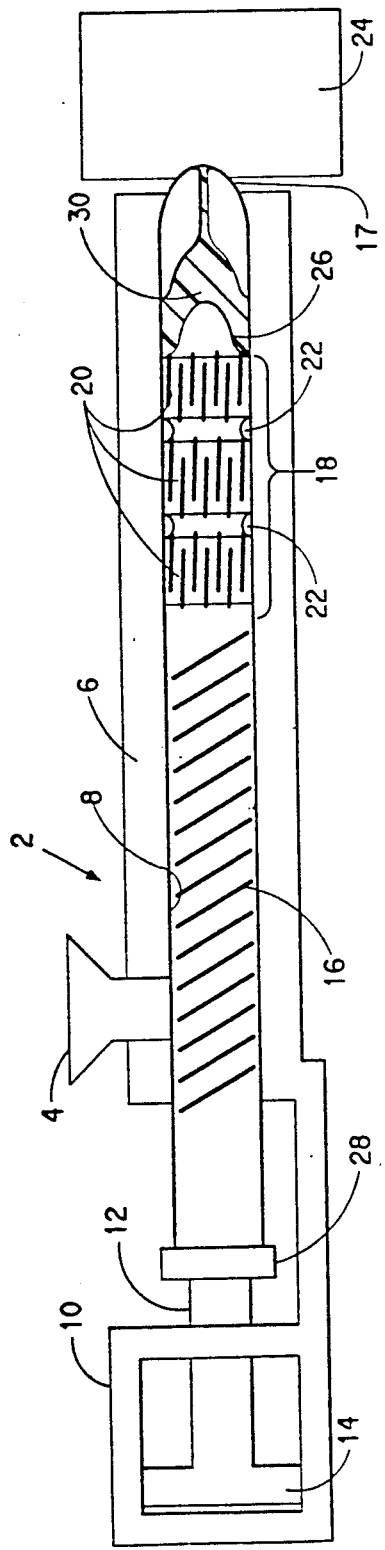
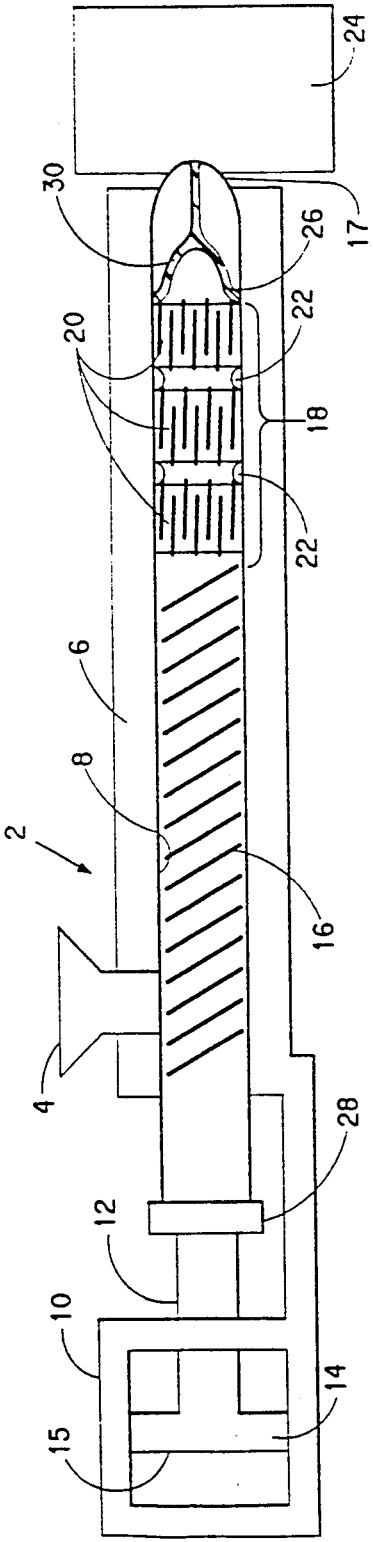

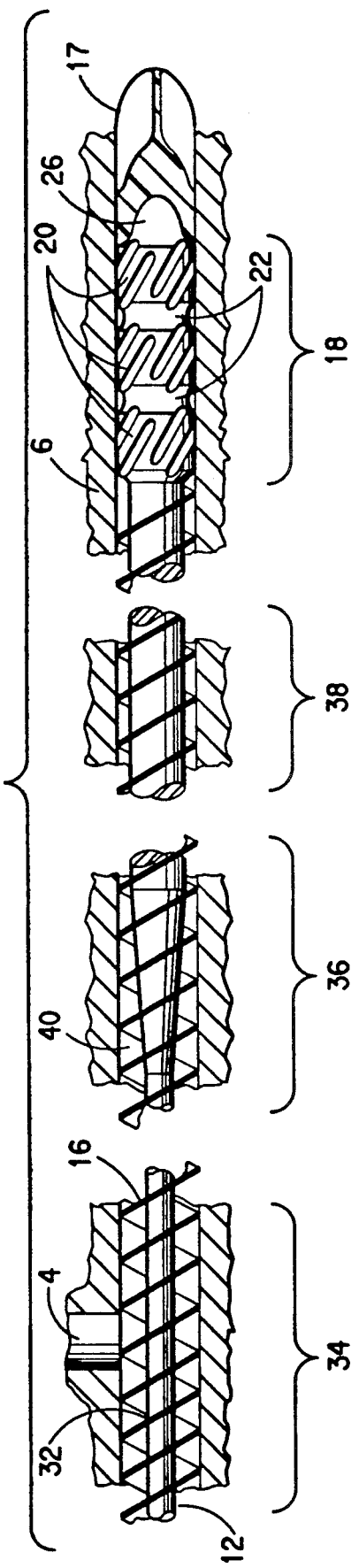
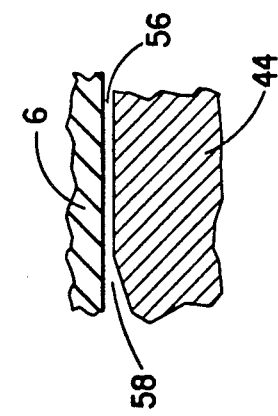
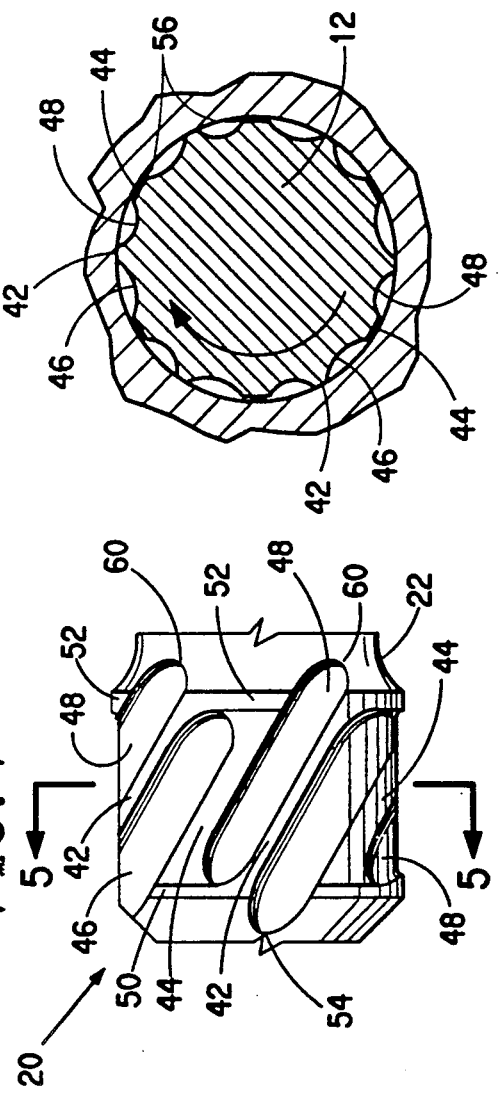

DIRECT FABRICATION

CROSS REFERENCE TO RELATED APPLICATION

This application is a continuation-in-part of copending application Ser. No. 07/575,545, filed Aug. 27, 1990.

FIELD OF INVENTION

This invention relates to the direct fabrication of incompatible thermoplastic resins which is applicable to upgrading the properties and thus the utility of recycle plastics.

BACKGROUND OF THE INVENTION

Post consumer plastics, such as polyester resins, can be recycled by melt fabrication to produce articles which can serve in utilities usually less demanding than the same articles molded from virgin resin. The reason for this less demanding utility may arise from the presence of contaminants accompanying the post consumer plastic. Efforts are made to remove all contaminants, but this is an elusive goal under the current state of recycle technology.

It thus becomes desirable to incorporate resin modifiers in the recycle resin which will upgrade its properties. For recycle polyester resins, a highly desirable group of modifiers are the ethylene random copolymer tougheners such as disclosed in U.S. Pat. No. 4,172,859 (Epstein I). In most cases, these modifiers are incompatible with the polyester matrix resin making it difficult to get the fine dispersion of modifier into the matrix resin that is necessary for the modifier to upgrade the properties of the matrix resin rather than detract therefrom or affect them so modestly that the modification is economically impractical. The same situation exists for virgin resins when the modifier resin is incompatible therewith.

U.S. Pat. Nos. 4,172,859 (Epstein I) and 4,174,358 (Epstein II) disclose the toughening of polyester and polyamide resins, respectively, by the incorporation of relatively low modulus random copolymers in the polyester or polyamide matrix. The methods of incorporation disclosed are (i) melt blending in a twin screw extruder or other conventional plasticating device, such as a Brabender or Banbury mill, (ii) blending by coprecipitation from solution, and (iii) blending or dry mixing of the components, followed by melt fabrication of the dry mixture by extrusion (Epstein I, col. 10, 1. 37–47). In the case of melt blending, further details on the use of the twin screw extruder are disclosed, ending with the extruder producing an extrudate which is cooled in a water bath, cut, dried, and molded into test pieces (Epstein I, col. 10, 1. 48–57). The cutting step produces molding pellets, generally having at least one dimension which is at least 2 mm. The molding step involves the use of an injection molding machine (Epstein I, col. 12, 1. 19–22), i.e., the molding pellets are fed to the injection molding machine for fabrication into the test bars. Epstein II sometimes uses other plasticating apparatus (Brabender, roll mill) in place of the twin screw extruder.

In both Epstein I and Epstein II, the injection molded test bars were prepared in two steps, first, compounding of the random copolymer into the matrix resin to form molding pellets (hereinafter referred to as pre-compounding), followed by injection molding to form articles as the second step. This sequence of steps was selected in the Epstein patents because of the need to achieve a very fine dispersion of the random copolymer within the resin matrix in order to realize optimum toughening in the molded articles, e.g., impact test bars. The patents disclose the fineness of this dispersion desired, e.g., random copolymer particle size of 0.01 to 3 microns, but preferably 0.02 to 1 micron, within the matrix (Epstein I, col. 5, 1. 14–15). The second step, injection molding, takes the molding pellets, melts them and injects the molten resin into the test bar mold. The dispersion is accomplished in the pre-compounding step and the fabrication is accomplished in the injection molding step. Example 168 of Epstein II departs from this combination of operations by extruding a film from a blend of 66 nylon with a fumaric acid-grafted EPDM and subjecting the extruded film to stretching or thermoforming.

This has been the commercial practice for toughening polyester and polyamide resins with other more flexible resins which are relatively incompatible with these matrix resins. This is the present commercial practice which offers itself for use to upgrade post consumer plastics. Unfortunately, this two step preparation process has the disadvantage of raising the cost of the molded articles.

It would be desirable if the pre-compounding step could be eliminated and the matrix resin and toughening resin be brought together for the first time as the feed to the injection molding machine, so that articles could be directly fabricated from the blend components.

Unfortunately, injection molding, such as that used in common single-stage injection molding machines does not lend itself to making a fine dispersion of incompatible resins within a matrix resin, hence the need heretofore for the pre-compounding step. Such injection molding machines use a single screw which both reciprocates and rotates within a barrel in the following sequence of steps which constitute the molding cycle:

(i) screw forward or injection (fill) time
(ii) hold time
(iii) mold open (eject) time.

During the screw forward time, the screw rams towards the injection port (nozzle) of the machine to force molten resin into the mold. Also included in this step is the time the screw is held in the forward position to keep the mold full of molten resin as the molded article starts to solidify.

During the hold time, the screw rotates and retracts under the pressure of the molten resin being forced by the screw into the forward end of the barrel, i.e., adjacent the injection port of the barrel. During this rotation, the resin feed to the injection molding machine becomes melted and transported into this injection position. Normally, when the screw retracts to a certain point, this means the forward end of the barrel is filled with the desired amount of molten resin and the screw stops rotating. Additional hold time is typically taken up with the screw positioned stationary in the retracted position until the molded article has cooled sufficiently.

During the mold opening step of the cycle, the screw remains stationary and retracted while the mold opens and the molded article is removed from the mold.

A typical molding cycle might take 43 seconds, consisting of 20 seconds screw forward time, 20 seconds hold time, and 3 seconds mold open time. Of the 20 seconds hold time, typically only a portion of it is screw rotation time, e.g., 5 seconds whereby it is apparent that the screw rotates for only a small fraction of the time of molding cycle.

Faced with this fact, pre-compounding has served as the standard for resin feed of incompatible resins to injection molding machines.

C.P.J.M.Verbraak and H. E. H. Meijer, "Screw Design in Injection Molding", *Polymer Engineering and Science*. Vol. 29, No. 7, pp. 479-487 (April, 1989) discloses the insufficient plasticating capacity of injection molding with high capacity (p. 479) and the testing of screw designs in injection molding using screw sections taken from continuous extrusion practice (sentence beginning p. 479-480). The article reports the testing of both distributive mixing and dispersive mixing capability. In distributive mixing, polyethylene is blended with color masterbatch to determine color distribution within the resultant blend obtained with various screw designs. Color masterbatch is normally made from colorant dispersed in polymer which is the same or is at least miscible with the resin being colored, so that uniform coloring of the resin can occur in injection molding. In dispersive mixing, ethylene-propylene-diene (EPDM) elastomer is blended with polypropylene (PP) using various screw designs in an injection molding machine. In dispersive mixing, the elastomer may remain a separate dispersed phase within the polymer matrix or become dissolved in the polymer matrix if sufficient compatibility (miscibility) exists.

Verbraak et al. reports testing eight different screws for dispersive mixing and summarizes the results of this testing as follows:

"A reasonable morphology was achieved only with a combination of Ingen Hausz, Maddock and pineapple sections and a high back pressure. However, the thermal load on the polymer (the resulting melt temperature exceeded the barrel temperature over 80°) caused degradation of the PP, resulting in slightly poorer mechanical properties than those of the commercial blend."
(p. 481).

This "reasonable morphology" is based on examinations at only 40X and 160X magnification. While "globs" of EPDM are visible at these low magnifications, the degree of dispersion necessary to obtain optimum toughening is not visible at these magnifications.

Even with the degree of dispersion or miscibility of the EPDM in the polypropylene obtained, this was at the expense of polymer degradation because of overheating of the polymer within the barrel. This result required greatly increased back pressure on the screw, i.e., pressure applied to retard the retraction of a screw during the hold time portion of the overall injection molding cycle. As indicated in Table 3, for the particular screw in question, 1H6M5PA, the back pressure was increased from 0 bar to 150 bar, which increased plasticating time from 8.3 to 17.7 seconds.

The result of the dispersive mixing reported in terms of IZOD impact strength at $-40°$ C. in $kJ/m^2$ in Table 3 is rather uninspiring. The maximum impact strength achieved was 8.6 $kJ/m^2$ for the polypropylene/EPDM blend, which corresponds to 87.4 J/m when converting the test result to the procedure to ASTM D-256. D'Orazio et al., *Polymer Engineering and Science*, June, 1982 reports the room temperature impact strength of polypropylene/EPDM in an 85/15 wt. ratio to be only 2.6 $J/cm^2$ which corresponds to 117.4 J/m when converting the test result to the procedure of ASTM D-256.

In other words, the blend of polypropylene/EPDM is not very tough to begin with, especially from the point of view of applications demanding room temperature impact toughness of 300 J/m and higher. Verbraak et al. does not disclose his dispersive mixing to achieve this desired toughness result.

In *Injection Molding Machines*, by A. Whelan, published by Elsevier Applied Science Publishers, Ltd., Essex, England (1984) the use of back pressure in injection molding machines is generally described on pages 398-401. Back pressure is the pressure the screw must overcome in order to retract (p. 398). Back pressure is usually adjusted as low as possible which yields the result of a well-compacted melt which is free from bubbles or voids (p. 399). The use of increased back pressure will result in improved mixing, but accompanied by disadvantages of long screw recovery times, high pressures on the resin melt which may result in nozzle drooling, and increased wear of the injection molding machine (p. 399).

Du Pont Information Bulletin A-88012 (1973) provides information on the use of back pressure in injection molding. Back pressure is disclosed to be helpful for acrylic resins as a way of preventing air pick-up in the screw which cause black streaks in the molded part. For polyamide (Zytel ®) and polyoxymethylene (Delrin ®), back pressure may help produce a more uniform melt temperature and in color mixing, but is not needed for most molding and could cause nozzle leakage.

EPO 0 340 873 A1 discloses a mixing device with distributive mixing action for an extruder and injection molding machine, which is useful for mixing viscous materials such as melted plastics and rubber, materials such as soap and clay in addition to foodstuffs such as dough and margarine. Product literature on the mixing device of this publication, entitled "Twente Mixing Ring", published by the University of Twente, and understood to have been printed in November, 1989, discloses various mixing applications and test results including the disclosure of "fewer unmelted particles". The existence of unmelted particles indicates that this device is intended for distributive mixing.

U.S. Pat. No. 4,912,167 discloses an improvement in melt blends of polyester resin with an epoxide copolymer, the improvement involving the incorporation of metal salts of certain acids or certain carboxyl-containing polymers, the metal salts being selected from the group consisting of $Al^{+++}$, $Cd^{++}$, $Co^{++}$, $Cu^{++}$, $Fe^{++}$, $In^{+++}$, $Mn^{++}$, $Nd^{+++}$, $Sb^{+++}$, $Sn^{++}$, and $Zn^{++}$. The nature of this improvement is disclosed to be increased melt strength and increased melt viscosity for the blends, enhancing the blow moldability of the blends. The blow molding fabrication is disclosed to be carried out in two steps, first the ingredients are melt blended and pelletized and these pellets are then fed to an extrusion blow molding machine (Col. 4, 1. 36-45).

In summary, injection molding has been used to obtain distributive mixing of colorant within polymer, while preparing the polymer for injection molding. Verbraak et al. discloses an unsuccessful attempt to perform dispersive mixing in an injection molding machine. The polymers used in Verbraak et al., polypropylene and ethylene-propylene-diene elastomer, are fairly compatible as indicated by the similarity of their solubility parameters of 16.0 $(J/cm^3)^{\frac{1}{2}}$ and 16.5 $(J/cm^3)^{\frac{1}{2}}$, respectively.

There still exists the need to be able to more economically injection mold a blend of incompatible thermoplastic resins, which would be especially useful for upgrading post consumer plastics, by eliminating the need for pre-compounding of the resins.

SUMMARY OF THE INVENTION

The present invention satisfies this need by providing a process for the direct fabrication of incompatible resins, i.e., the pre-compounding step can be eliminated, and the incompatible resins can be compounded sufficiently within the injection molding machine and then directly molded to produce articles of modified resins all without causing degradation of any of the resins used.

The process for the direct fabrication of articles from incompatible resins comprises a) combining particles of a first thermoplastic resin with particles of a second thermoplastic resin which is incompatible with said first resin, this incompatibility being characterized by a difference of at least 2 $(J/cm^3)^{\frac{1}{2}}$ between the solubility parameters of the first and second resins, said particles having at least one dimension of at least 2 mm, said first resin being present in a major proportion and said second resin being present in a minor proportion.

b) melting this combination of particles while mixing them together c) periodically shearing the resultant melt without degrading the resins therein to disperse the melt of the second resin within the melt of the first resin, the shear rate and shear time of this periodic shearing step being effective to result in a number average particle size of the second resin in articles fabricated from the resultant melt of less than about 1 micron, d) periodically forcing an amount of the resultant sheared melt into a pre-determined shape to obtain as a result thereof said article of said pre-determined shape directly fabricated from said combined particles.

This process is adaptable to being carried out in the typical single-stage injection molding machine which uses a single screw rotating and reciprocating within a barrel to melt, shear and inject molten resin into the mold of the machine. In the process conducted in this type of machine, the periodic shearing and periodic forcing steps are alternating, i.e., while the molten resin is being forced into the pre-determined shape in the mold, the screw is not rotating and therefore the melt within the barrel is not being subjected to shear.

The process of the present invention is also applicable to injection blow molding wherein the same alternating relationship between the shearing and forcing steps is observed. In a machine carrying out this particular process, the pre-determined shape is subsequently also subjected to blow molding within a second mold to produce the article desired.

The process of the present invention is also applicable to injection molding in a two stage machine wherein a single screw is used to melt resin and force it through a check valve into an injection cylinder. A ram then forces this molten resin into the mold. In one type of two-stage injection molding machine, the screw does not reciprocate, but it does stop rotation during the times the injection cylinder is filled with molten resin, and the ram injects the molten resin into the mold and the ram remains in the forward position to maintain pressure on the resin in the mold until it solidifies.

In another type of two-stage injection molding machine, the screw reciprocates similarly to the operation of a single-stage injection molding machine. In the two-stage machine, however, the forward thrust of the screw injects molten resin into the injection cylinder rather than the mold, and the ram then forces the molten resin into the mold. During the remaining step, the screw can rotate to melt resin, until the screw reciprocates to its back position, which gives a faster cycle time as compared to a single-stage machine. In this type of two-stage machine, the shearing and forcing steps are simultaneous.

The process of the present invention is also applicable to extrusion blow molding, wherein the forcing of the sheared melt into the pre-determined shape is done by extrusion of a tube. A mold closes around the tube. The mold is then transferred to a blow molding station for blow molding into the article desired. During the mold closure and transfer, the extruder screw is stopped, during which time the melt within the extruder is not being subjected to shear. Thus in the application of the present invention to extrusion blow molding, the periodic shearing and forcing steps are simultaneous.

In all cases, the process of the present invention produces either a finished article having generally the final shape desired or an intermediate article which is blow molded to the finished article. The process of the present invention is also continuous in that the first resin particles and second resin particles are fed into the process (the step of combining) and are then subjected to continuous processing until the articles, intermediate or finished, are melt fabricated therefrom.

The process of the present invention is accomplished by fitting the screw used in the injection molding, injection blow molding, or extrusion blow molding machine with an appropriate dispersion section and then operating the machine under conditions of shear which gives the fine dispersion result desired without degrading any of the resins.

The present process may also be described as being applicable to modifying polyamide and polyester resins as the matrix resins with incompatible resins which impart greater utility, notably toughness, to the matrix resins. Polyester resin is becoming increasingly available as post consumer plastic, and the process of the present invention is especially applicable to upgrading the properties of such resin.

When the direct fabrication process is practiced on the dispersion of epoxide copolymer elastomer into polyester resin, particularly when the polyester resin is flake derived from post consumer use, the result of the process does not consistently yield products of optimum toughness, i.e., the toughness obtained on one occasion may not be reproducible on other occasions. Another embodiment of the present invention solves this problem by providing much more consistently high toughness results when these resins are used. This embodiment may be described as a process for the direct fabrication of articles from a major proportion of polyester resin and a minor proportion of ethylene/epoxide copolymer elastomer, said copolymer elastomer in combination with said polyester resin providing substantial toughening of said articles, comprising (a) combining particles of said polyester resin with particles of said copolymer elastomer, said particles having at least one dimension of at least 2 mm, (b) melting this combination of particles while mixing them together, (c) periodically shearing the resultant melt without degrading the polyester resin or copolymer elastomer to finely disperse the melt of the copolymer elastomer within the melt of the polyester resin, said shearing being carried out in the presence of adjuvant for said toughening of said articles incorporated into said melt, and (d) periodically forcing an amount of the resultant sheared melt into a pre-determined shape and obtaining as a result thereof said toughened articles of pre-determined shape directly fabricated from said combined particles.

The fine dispersion of the copolymer elastomer within the melt of polyester resin is preferably the same as in the other embodiments described hereinbefore, namely, the shear rate and shear time of the periodic shearing step being effective to result in a number average particle size of the copolymer elastomer in articles fabricated from the resultant melt of less than about 1 micron.

DESCRIPTION OF DRAWINGS

FIG. 1 is a schematic side elevation in cross-section of an injection molding machine useful for carrying out a process of the present invention, with the embodiment of the screw shown in the retracted position.

FIG. 2 shows the injection molding machine of FIG. 1 with the screw in the rammed or forward position.

FIG. 3 is a side view, in enlargement and indeterminate length, of the embodiment of screw shown in FIGS. 1 and 2 useful for carrying out the process of the present invention.

FIG. 4 shows in enlargement as compared to FIG. 3 one of the plurality of shearing sections making up the dispersion section of the screw of FIG. 3.

FIG. 5 is a cross section taken along line 5—5 of FIG. 4.

FIG. 6 shows in enlargement one embodiment of barrier flight for use in the shearing sections of the screw.

DESCRIPTION OF PREFERRED EMBODIMENTS

Figure 8:
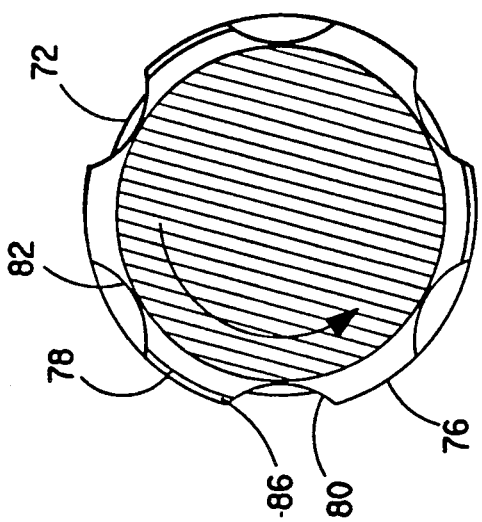
FIG. 8 shows a cross section of the dispersive mixing section of FIG. 7 taken along line 8—8 of FIG. 7.

The resin feed to the process of the present invention comprises a major proportion of a first thermoplastic resin and a minor proportion of a second thermoplastic resin which is incompatible with the first resin. With respect to the total weight of these resins, about 55 to 95% can be the first resin and correspondingly, about 5 to 45% can be the second resin. Preferably, the weight proportions of these resins are about 10 to 40% second resin and more preferably about 10 to 25% second resin, and even more preferably, about 10 to 20% second resin with the remainder being first resin. Since the second resin component will usually be the more expensive resin as compared to the cost of the first resin, it is desired to use as small a proportion of the second resin as is possible to accomplish the modification desired, which will generally be no greater than about 20 wt. % of the combined weight of the first and second resins.

The desire to minimize the proportion of more expensive second resin increases the need for fineness in the particle size of the second resin dispersed in the first resin in articles directly fabricated from the resin feed, so that the second resin present in its limited amount can provide the modification effect desired.

The first resin is provided in the form of particles and the second resin is provided in the form of particles essentially separate from the particles of first resin, i.e., the resins are in different particles. The particles have bulk as indicated by their having at least one dimension which is at least about 2 mm. The particles are melt derived, either from virgin or recycle polymer. As such they will typically be in the form of pellets melt cut or cut from a previously extruded strand from the original manufacture of the resin. Dry flake of the resin is another particle form, but pellets are normally preferred for use of handling. Nevertheless, for post consumer plastics, the recycle form of the resin will typically be flakes obtained by chopping up the recycle articles such as bottles.

The first and second resins are also incompatible with one another in the molten state. One indication of this incompatibility is that although the second resin is reduced to very fine particle sizes within the first resin matrix by the process of the present invention, the second resin nevertheless remains as particles, and does not dissolve, within the matrix, indicating immiscibility of the second resin in the first resin. These micron and smaller size particles of second resin can be seen under high magnification, e.g., 5,000× or greater. The incompatibility between the resins in the molten state is manifested by the high interfacial tension of the molten particles of the second resin in the melt of the first resin. This high interfacial tension makes it difficult to break up the second resin particles into fine particles, i.e., the molten particles of the second resin want to retain their particle size rather than break up into much smaller particles.

The incompatibility between the first and second resins used in the present invention can be also characterized by difference between solubility parameters. Solubility parameter is a measure of the cohesive energy density of the resin. Thus, the solubility parameter is proportional to the strength of attraction between the molecules making up the resin. The closer the solubility parameters of two different resins, the more miscible they are with one another. The converse is true as the difference between solubility parameters increases. Solubility parameter of resins can be measured by determination of maximum swelling of the resin in a series of solvents having different solvent action on the resin, with the solubility parameter of the solvent giving the maximum swelling action being the solubility parameter of the resin. Solubility parameters for many polymers are disclosed in the literature, see for example Table 4, pp, 362–367 of the *Polymer Handbook* by J. Brandrup and E. H. Immergut, Interscience Publishers (1966) wherein the solubility parameters are reported in $(cal/cm^3)^{\frac{1}{2}}$.

Greater relative precision is available by calculating the solubility parameter from the formula $\Sigma \rho F_1/M$ wherein $\rho$ is the density of the resin $\Sigma F_1$ is the sum of the molar attraction constants of all the chemical groups in the polymer repeat unit, and M is the molecular weight of the repeat unit in the polymer, as described in *Polymer Blends*, by D. R. Paul and S. Newman, Academic Press, p. 46 (1978). Molar attraction constants are disclosed on p. 47 of *Polymer Blends*. To illustrate the application of this formula as applicable to copolymers, solubility parameter for the ethylene/n-butyl acrylate/glycidyl methacrylate copolymer used in Examples 1–6, 23 and 24 and having the following mole %'s of each comonomer 90.3, 8.3, and 1.4, respectively is calculated as follows:

The molecular weights of the 3 monomers are:

| ethylene | 28. |
|---|---|
| butyl acrylate | 128. |
| glycidyl methacrylate | 142. |

The molar attraction constants in $(cal/cm^3)^{\frac{1}{2}}$/mole from Polymer Blends are:

| CH3— | | 147.3 |
|---|---|---|
| —CH2— | | 131.5 |
| —CH= | | 85.99 |
| —COO— | | 326.58 |
| —O— | (EPOXY) | 176.2 |

The sum of the molar attraction constants are:

| for ethylene | 263.0 |
|---|---|
| for butyl acrylate | 1085.87 |
| for glycidyl methacrylate | 1162.6 |

The sum of the molar attraction constants of the chemical groups divided by the mole weight of the repeat unit is as follows:

| for ethylene | 263/28 = 9.39 |
|---|---|
| for butyl acrylate | 1085.87/128 = 8.48 |
| for glycidyl methacrylate | 1162.6/142 = 8.19 |

The solubility parameter for the resin is the sum of these values in proportion to the mole % of the comonomer present X resin density, as follows:

| for ethylene | .903 × 9.39 = 8.429 |
|---|---|
| for butyl acrylate | .083 × 8.48 = 0.703 |
| for glycidyl methacrylate | .014 × 8.19 = 0.115 |
| TOTAL | 9.297 × |
| .940 (polymer density at room temperature) = | 8.739 $(cal/cm^3)^{\frac{1}{2}}$ |
| or in SI units 8.739 × 2.0455 = | 17.88 $(J/cm^3)^{\frac{1}{2}}$ |

The calculated solubility parameters of a number of resins useful in the practice of the present invention are as follows:

| Resin | Solubility Parameter $(J/cm^3)^{\frac{1}{2}}$ |
|---|---|
| 1. nylon 66 | 22.6 |
| 2. PET | 22.5 |
| 3. polypropylene | 16.0 |
| 4. ethylene/n-butyl acrylate/ glycidyl methacrylate copolymer from above calculation | 17.9 |
| 5. 67.4% by wt. ethylene/28.9% by wt. propylene/3.7% by wt. 1,4-hexadiene copolymer (EPDM) Examples 14 and 15 | 16.5 |
| 6. EPDM grafted with maleic anhydride Examples 14 and 15 | 16.6 |
| 7. Ionomer of Examples 16–22 (acid copolymer basis) | 17.6 |

| Resin | Solubility Parameter $(J/cm^3)^{\frac{1}{2}}$ |
|---|---|

The sensitivity of the compatibility relationship between resins is illustrated by the attempt of Verbraak et al. to disperse EPDM in polypropylene, the solubility parameters of these resins differing from another by 0.5 $(J/cm^3)^{\frac{1}{2}}$. With normal injection molding machine operation using a special screw, dispersion was poor. When back pressure on the screw was used, the "globs" of EPDM disappeared but at the expense of resin degradation. The process of the present invention can obtain fine dispersion of resins having even greater incompatibility, for example characterized by a difference between solubility parameters of at least 2 $(J/cm^3)^{\frac{1}{2}}$ and more preferably at least 3 $(J/cm^3)^{\frac{1}{2}}$.

The above calculation of 0.5 $(J/cm^3)^{\frac{1}{2}}$ difference is based on the assumption that the EPDM used by Verbraak et al. was the same as resin 5 described above. If the EPDM was the other popular EPDM, namely ethylene/propylene/5-ethylidene-2-norbornene, the solubility parameters are nevertheless very close to the above reported value for EPDM (and to polypropylene). For two norbornene-based EPDM copolymers representing the approximate extremes of compositions commercially available, the solubility parameters are as follows: For 69% by wt. ethylene/29% by wt. propylene/2% by wt. 5-ethylidene-2-norbornene copolymer, the solubility parameter is 16.2 $(J/cm^3)^{\frac{1}{2}}$, and for 68% by wt. ethylene/28% by wt. propylene/4% by wt. 5-ethylidene-2-norbornene copolymer, the solubility parameter is 16.4 $(cal/cm^3)^{\frac{1}{2}}$. Prior to rounding off, the spread between the solubility parameters for all these EPDM polymer, including the 1,4-hexadiene EPDM described above, is 0.22 $(J/cm^3)^{\frac{1}{2}}$.

The dispersion obtained by the process of the present invention can be characterized by the second resin present as a discrete phase within the matrix of first resin, with the particles (areas of discrete phase) of second resin preferably being smaller than about 5 microns, which corresponds to a 5000× reduction in the size of the second resin particles fed to the process. The second resin also preferably has a number average particle size within the matrix of less than about 1 micron. Number average particle size is measured by the procedure disclosed in U.S. Pat. No. 4,753,980 in col. 6, lines 10–44.

Preferred first resins used in the process of the present invention are polyesters, polyamides, polyacetals, and polyarylates. Examples of polyesters include polyethylene terephthalate (PET), copolymers of PET and polyethylene isophthalate, cyclohexyl dimethanol/terephthalic acid copolymer, cyclohexyl dimethanol/ethylene glycol/terephthalic acid copolymers, polyethylene 1,4-dicarboxynaphthenate, polybutylene terephthalate, and polycarbonates. Examples of polyacetals are the oxymethylene homopolymer and copolymers. Examples of polyarylates include the polymers derived from polymerization of bisphenol A with isophthalic and terephthalic acids, preferably a mixture of about 50% of each acid (wt. basis). Examples of polyamides include conventional semicrystalline nylons such as nylon 6, nylon 66, nylon 69, nylon 6/10, nylon 6/12, nylon 11, nylon 12, nylon copolymers such as 6/66, 66/6, 6/610, 6/612, and recently introduced nylon 4/6, and nylon 12/12. Amorphous nylons such as the copolymers of hexamethylene diamine and isophthalic and terephthalic acids, copolymers of 2,4,4- and 2,2,4-trimethylhexamethylene diamine and terephthalic acid, and p-amino cyclohexyl methane and azelaic acid can also be used in this invention. The first resin can be a single resin or a blend of compatible resins.

The selection of second resin and its amount will depend on the first resin used and the effect desired from the modification of the first resin. Preferably the second resin is an elastomer which when finely dispersed within the first resin, significantly improves toughness of the first resin by a factor of at least $3\times$ and preferably at least $5\times$. Toughness improvements of $10\times$ and higher are obtainable by the process of the present invention. In this case, the molecular weight of the first resin should be sufficiently high to provide some toughness to articles molded solely from the first resin, e.g., to provide a toughness of at least about 15 J/m and preferably at least about 30 J/m. Preferably, the toughness of articles molded from the blend of resins exceeds 300 J/m. The toughness comparisons and the toughness values reported herein are obtained by notched Izod impact test conducted at room temperature in accordance with ASTM D-256, unless otherwise indicated. Elastomers are those thermoplastic resins which at room temperature exhibit substantial deformability, e.g., stretchability and substantially immediate complete recovery of original dimension upon release of the force causing the deformation. They also typically exhibit a glass transition temperature (Tg) below ambient temperature (20° C.). Examples of second resins include ethylene copolymers wherein ethylene is copolymerized with one or more of such monomers as vinyl acetate, alkyl (meth)acrylate, such as methyl, ethyl, or butyl(meth)acrylates (meth)acrylic acid, (meth)acrylamide, carbon monoxide, or glycidyl (meth)acrylate. Examples of such ethylene copolymers include ethylene/n-butyl acrylate/carbon monoxide, ethylene/n-butyl acrylate/glycidyl methacrylate, and ethylene/vinyl acetate/carbon monoxide. The ethylene-vinyl acetate and ethylene/(meth)acrylate copolymer may include grafted acid, anhydride or glycidyl groups. Additional ethylene copolymers include ionomers and ethylene/propylene and ethylene/propylene/diene elastomers with or without grafted acid or anhydride groups. Examples of additional second resins include styrene copolymer-based elastomers such as styrene-ethylenebutene block copolymers with or without grafted acid anhydride, or glycidyl groups, styrene/butadiene block copolymer, styrene/acrylic ester/acrylonitrile copolymer. Examples of additional second resins include the block copolyetherester elastomers such as those derived from polymerization of 1,4-butylene terephthalate with poly(tetramethylene ether) glycol terephthalate, such as the copolymers made from 25:75 weight proportion of these monomers. The second resins can also be a blend of compatible resins.

Preferred elastomers are the ethylene/glycidyl (meth)acrylate copolymers which also contain $C_1$–$C_6$ alkyl (meth)acrylate, preferably n-butyl acrylate, wherein the amount of glycidyl (meth)acrylate constitutes about 1 to 10 wt. % of the copolymer, preferably about 2.5 to 7 wt. %, and the alkyl (meth)acrylate constitutes about 15 to 35 wt. % of the copolymer, and the ethylene constitutes about 55 to 84 wt. % of the copolymer to total 100%.

Preferably the relationship of the first and second resin to one another is such that the dispersion of the extremely fine particles of second resin within the matrix of first resin in articles fabricated by the process of the present invention is also accompanied by the particles adhering to the matrix, despite the incompatibility of the resins. This adhesion promotes the toughening of the fabricated article and may be detected by exposing the article to solvent, which reveals the presence of gel rather than the article completely dissolving in the solvent. When the first and second resins are polyester and epoxide copolymer elastomers, respectively, this gelation is believed to be a manifestation of reaction between the polyester resin matrix and the dispersed fine particles of the copolymer elastomer.

The first and/or second resins can contain the usual compounding ingredients, e.g. antioxidants, stabilizers, colorants, and fine particulate inorganic extenders and fillers.

The operation of the process of the present invention will be described with reference to the drawings.

The first step is to combine the particles of first and second resin. This can be done by simultaneously feeding the particles as individual streams or a dry mixed blend to the feed hopper 4 of an injection molding machine 2 (FIGS. 1 and 2). The resins present in the particles are pre-conditioned, e.g, dried, as may be required, depending on the resins being used. A typical dry condition is such that the dried resin has a moisture content of less than about 0.02 wt. % when the resin is polyester and less than about 0.05 wt. % when the resin is polyamide.

The injection molding machine includes a barrel portion 6, defining a heated cylindrical chamber 8 and a hydraulic cylinder portion 10. A plasticating screw 12 is positioned axially within the chamber 8 and extends into the hydraulic cylinder portion 10 of the machine, where the screw terminates with a cylinder head 14.

The screw has a helical flight 16 for advancing the particle feed from hopper 4 along the length of chamber 8 towards the forward end of the barrel portion 6 which is equipped with an injection nozzle 17. During this advancement the resin particles become mixed together, compacted, and melted from the heat supplied by the barrel portion and internally generated heat from the mixing and compaction. For amorphous resins, the melt condition means that the resin is heated above its softening point. For crystalline resin, the melt condition means that the resin is heated above its melt temperature.

The molten combination of resins is next received by the dispersion section 18 of the screw which consists of three shear sections 20 separated by intervening transverse mixing channels 22. Further details of the screw will be described later herein with reference to FIGS. 3 to 6.

The dispersion section 18 which may be called the dispersion head of the screw 12 reduces the size of the molten particles of second resin and finely disperses them within the molten first resin.

The forward position of the screw 12 is shown in FIG. 2. This position is representative of the forward time of the injection molding cycle, in which the screw 12 forces an amount of molten resin through the nozzle 17 into the mold 24 which is merely shown as a box because of the conventionality of this aspect. During this time, including the time the screw is maintained in the forward position to maintain pressure on the contents of the mold, the screw is not rotating, and accordingly, the resin melt is not being subjected to shear. The forward position of the screw 12 is obtained by applying hydraulic pressure by conventional means against the face 15 of the cylinder head 14 of the screw. The nose 26 of the screw generally conforms to the interior shape of the nozzle so as to minimize the amount of molten resin remaining in the cylindrical chamber. The nose 26 may also be equipped with a conventional check valve (not shown) to prevent molten resin from back flow within the cylindrical chamber when the screw rams forward and is held in the forward position.

Upon completion of the screw forward time, the screw commences rotation, for example via gear 28 mounted on the screw 12 and engaged with conventional gear driving means (not shown). During this rotation, the particle feed is subjected to additional melting as it advances along the screw 12 and to shear as the resultant melt traverses the dispersion section 18 of the screw.

During the rotation of the screw, the pressure against the cylinder head 14 of the screw is reduced and the screw 12 retracts within the chamber 8 as the molten, sheared resin fills up the forward end of the chamber. FIG. 1 shows the screw 12 in the retracted position and the presence of molten resin 30 in the forward end of the chamber. When the screw reaches this position, the amount of the molten resin 30 present in the forward end of the chamber is the amount necessary to fill the pre-determined shape provided by the mold. The screw rotates during the retraction and when it reaches the retracted position, the rotation of the screw is stopped. This retraction time and the time spent in the retracted position to permit the molded article to cool to solidification is the hold time of the injection molding cycle. The screw rotates only during its retraction during the hold time. The screw is also standing still while the mold is opened and the molded article removed therefrom.

Accordingly, it is apparent that the shearing of the resin melt is only periodic during the injection molding cycle and the forcing of the sheared melt into the shapes (articles) desired is periodic, with these actions alternating with one another, and with considerable additional portion of the injection molding cycle being taken up with the screw standing still, i.e., not rotating and therefore not shearing the melt.

In accordance with the present invention, the retraction of the screw is retarded so as to extend the rotation time of the screw. This is accomplished by applying pressure to the face 15 of cylinder head 14 of the screw during the hold time of the molding cycle. The effect of this retardation is to extend the shearing time for the molten resin. This is applicable to single-stage injection molding, two-stage injection molding wherein the screw retracts, and injection blow molding. For typical injection molding operations, the back pressure on the screw is about 0.3 MPa (50 psi). In operation of the process of the present invention, the back pressure will generally be at least 1.5 MPa.

For two-stage injection molding wherein the screw does not retract and extrusion blow molding, the high degree of shear necessary to accomplish the fine dispersion desired is obtained by the use of the dispersion section on the screw at the rotation speed and spill clearance which provides this shear. The check valve present in the two-stage injection molding machine between the screw barrel and the injection chamber shears the molten resin as it is forced by the screw into the injection cylinder, to supplement the shear and thus the dispersion provided by the dispersion section of the screw.

Preferably, the shear time in the molding operation comprises at least about 15% and more preferably at least about 20% or at least about 25% of the molding cycle, with the choice of minimum shear time depending on the particular molding operation. Most preferably the shear time is at least 30% of the cycle time.

In combination with the extended shearing time is the intensity of the shear to which the molten resin is subjected by the dispersion section of the screw. FIGS. 3 to 6 show details of one embodiment of screw design for accomplishing the necessary shear.

Screw 12 has a helical bearing flight 16 and a root 32 which forms in sequence extending in the direction of resin movement along the chamber 8, a feed section 34, a transition section 36, and a metering section 38 which are designed to deliver a steady flow of molten resin to the dispersion section 18 of the screw.

The feed, transition, and metering sections are conventional screw features and can have many different designs to accomplish this delivery. In the embodiment shown in FIG. 3, the root 32 has a constant diameter over several turns of flight 16 for receiving the resin particles. In the transition section 36, it has a root of increasing diameter, and in the metering section 38, the root returns to a constant diameter corresponding to the largest root diameter of the transition zone. In accordance with this configuration, the channel 40 formed by the helical flight 16 and root 32 coupled with the interior wall of chamber 8 decreases in volume within the transition section 36. Rotation of the screw in the direction causing the resin particles to advance from the feed section 34 through the transition section 36 causes the resin particles to become compacted to provide heating of the particles from several sources, the heat from barrel 6 and the heat generated within the chamber by compaction of particles within channel 40 and movement within these compacted particles caused by the relative movement of the particles as they are wiped along the wall of the heated barrel 6 by the helical bearing flight 16. Substantial melting of the resin particles is desired by the time the resins reach the metering section 38, where the resins may be exposed to additional heating from the barrel and motion of the resins within the shallow channel 40 present in this section.

The dispersion section 18 is designed to intensify the shear of the polymer during the next portion of its advancement along the chamber. In FIG. 3, the dispersion section 18 consists of three shearing sections 20 spaced apart from one another along the length of the screw to form transverse mixing channels 22 between adjacent sections 20.

As best shown in FIG. 4, each shearing section 20 comprises a plurality of bearing flights 42 and a plurality of barrier flights 44 interleaved with one another, each extending from the screw 12 and in the embodiment shown, each forming a helix angle with respect to the axis of the screw at 60°. The length of each shearing section is about the same as the diameter of the flight 42, which is the same as the diameter of the helical flight 16.

The spacing between the bearing flights and barrier flights form a corresponding plurality of interleaved entrance channels 46 and exit channels 48 extending along the axis of the screw and having the same helix angle as the bearing and barrier flights.

Means are provided for closing the entrance or upstream end 50 of each exit channel, and means are provided for closing the exit end or downstream end 52 of each entrance channel. In this embodiment, the closure means consists of a web extending from the corresponding ends of the bearing flights and having the same diameter thereas so that the resins being plasticated do not pass over the closed ends 50 and 52 of channels 46 and 48. Instead, the resins are forced by the metering section 38 of the screw 12 into the entrance or upstream ends 54 of the entrance channels 46. In this way, the metered resins are divided into a plurality of streams of resin corresponding to the number of entrance channels present.

Spurred by the metering section 38, the resins are forced along the length of the entrance channels 46, filling their volume with resin until the resin reaches the closed downstream ends 52 of these channels.

The bearing flights 42 form the force or leading side of the entrance channels 46, and the barrier flights 44 form the aft or trailing side of the entrance channels, with reference to the direction of rotation of screw 12. As shown best in FIG. 5, the barrier flights 44 are spaced further from the interior wall of barrel 6 as compared to the bearing flights, to form a small clearance 56 between the barrier flights and the interior wall of the barrel.

The entrance channels 46 in effect overflow with resin over the barrier flights 44 through the clearances 56 (spill clearance) to enter the trailing exit channels. In the course of passing through these clearances 56, any particles of resin present are subjected to shear and heating to cause the particles to melt and break down into small particles. The width of the clearance 56 (spill clearance) between the barrier flight and wall of the barrel 6 is established such that sufficient shear is present to cause this break down into smaller particles and the smaller particles to break down into even smaller particles. In the embodiment shown in FIG. 4, the entrance channels are wider and therefore have greater volume than the exit channels, which provides greater residence time of the resins in the entrance channels to promote the softening and melting of the resins prior to shearing within clearance 56 in case there are non-melted particles.

FIG. 6 shows one embodiment for shaping each barrier flight 44 so as to promote attenuation and thus break down of polymer particles. In this embodiment, the entry side of the clearance 56 from the entrance channel 46 is tapered away from the wall of the barrel 6 to form a wedge shaped opening 58 to the clearance 56. As the resin melt moves into the clearance 56, it becomes subjected to greater and greater shear arising from compression between the decreasing space within the wedge-shaped opening 58 and the wall of the barrel.

The resins entering the exit channels 48 via their respective barrier flights 44 and clearances 56 eventually fill up the exit channels to eventually leave these channels at the open downstream end 60 of each such channel.

Upon leaving the exit channels of shearing section 20, the resins enter the adjacent transverse mixing channel 22, where the streams of resin from the preceding exit channels 48 become united by the rotation of screw 12.

Further advancement of the resin causes it to be redivided into different streams of resin, as compared to the streams leaving the preceding exit channels 48, for entering the entrance channels 46 of the succeeding shearing section 20, to be subjected to additional shearing in the same way as described for the preceding shearing section 20. The mixing occurring in the transverse mixing channels and in the entrance and exit channels causes the second resin to become finely dispersed with the molten first resin.

This is repeated for each transverse mixing channel 22 and succeeding shearing section 20 to provide a dispersion of increasing fineness and uniform distribution, until the thoroughly plasticated resin reaches the nose 26 of the screw 12 and forward end of chamber 8, ready for melt fabrication. The number of shearing sections 20 is preferably at least 2 and more preferably at least 3, the number of such sections depending on the amount of shear that can be built into each dispersion section and the particular dispersion task to be accomplished within the cylindrical chamber housing the screw. The number of bearing and barrier flights per shearing section 20 will generally be from four to eight of each.

Some shear is accomplished in the feed, transition and metering sections of the screw, but this shear is minor and insufficient for dispersion as compared to the shear provided by the dispersion section 18. The dispersion section 18 accomplishes both shear and mixing of the resultant fine particles of second resin within the first resin.

Preferably, the dispersion section 18, under the conditions of plastication, achieves a shear rate of at least about 300 sec$^{-1}$ within the molten resin, more preferably at least about 450 sec$^{-1}$, and even more preferably at least about 900 sec$^{-1}$ for thorough dispersion of the second resin within the first resin.

Shear rate is the circumferential speed of the screw divided by the spill clearance (clearance 56). The circumferential speed of the screw is the screw diameter X 3.14159 X rpm. The spill clearance is the difference between the radius of the barrel or cylindrical chamber and the barrier flight radius. By way of sample calculation, for a barrel having an inner diameter of 44.5 mm, the circumference of the screw will be 139.7 mm. When the screw rotates at 100 rpm, the circumferential speed is 13970 mm/min or 232.8 mm/sec. For a spill clearance of 0.1524 mm, the shear rate is 232.8 mm/sec 0.1524 mm = 1528 sec$^{-1}$.

One limitation on the amount of shear applied to the molten resin being plasticated by the dispersion section 18 is that overheating of the resins to cause resin discoloration which is indicative of degradation and a deterioration of properties must be avoided. The present invention achieves this result by judicious choice of shear time and shear intensity conditions for the particular combination of first and second resin being processed. Shear intensity will depend on the melt viscosity of the resins being sheared, the screw rotation speed, the clearance 56 and the number of such clearances. Typically, the clearance 56 will be selected from the range of about 0.15 to 0.7 mm to obtain the result desired. Usually, the lower spill clearance will be no greater than about 0.35 mm.

The relative melt viscosities of the first and second resins under plasticating conditions in the dispersion section also contribute to the shear present in the dispersion section 18 to cause the molten particles of second resin to break down into smaller particles, and these smaller particles to break down into even smaller particles within the dispersion section. When the first resin is non-elastomeric, its viscosity usually decreases rapidly with increasing temperature. When the second resin is an elastomer, its viscosity usually decreases more slowly with increasing temperature. Preferably, the first and second resins are selected so that their melt viscosities at plasticating temperature produces the shear between resins described above, so as to achieve the best dispersion result possible for the plasticating conditions used. Preferably, the melt viscosities of the first resins will be within the range of about 5:1 to 1:5 of one another, i.e., the melt viscosity of the first resin can be from five times greater to 1/5 of the melt viscosity of the second resin. More preferably, the range of relative melt viscosities is about 2:1 to 1:2 and even more preferably about 1:1.

The foregoing detailed discussion is applicable to carrying out the process of the present invention in both injection and injection blow molding of articles. This discussion is applicable to injection molding in a two-stage machine whether or not the screw reciprocates. If the screw reciprocates, the opportunity is offered for increasing shear time by increasing back pressure on the screw to retard its retraction. If the screw does not reciprocate, the necessary shear is accomplished during the screw rotation time in the molding cycle. In both types of two-stage machines, the forcing of the molten resin through the check valve between the screw barrel and the injection chambers subjects the molten resin to high shear to augment the shear achieved by the dispersion head of the screw. The process of the present invention can also be carried out in extrusion blow molding wherein that the screw does not reciprocate. Instead it is the periodic rotation of the screw that forces an amount of molten resin into the shape desired. In extrusion blow molding, a blow-mold is then closed about the extruded shape (parison), and the mold is next transferred to a blowing station. During this mold closing and mold transfer, the screw does not rotate. In this embodiment, the fine dispersion of second resin within first resin is achieved by shear rate and shear time but without the possibility of extending the shear time by retarding retraction of the screw.

The screw design of FIG. 3 insofar as the design of the dispersion section 18 is concerned is a preferred design for shearing the melt of the combination of first and second resins in the process of the present invention. In view of the results obtained with this design, other designs for accomplishing this result will be suggested to those skilled in the art.

Figure 7:
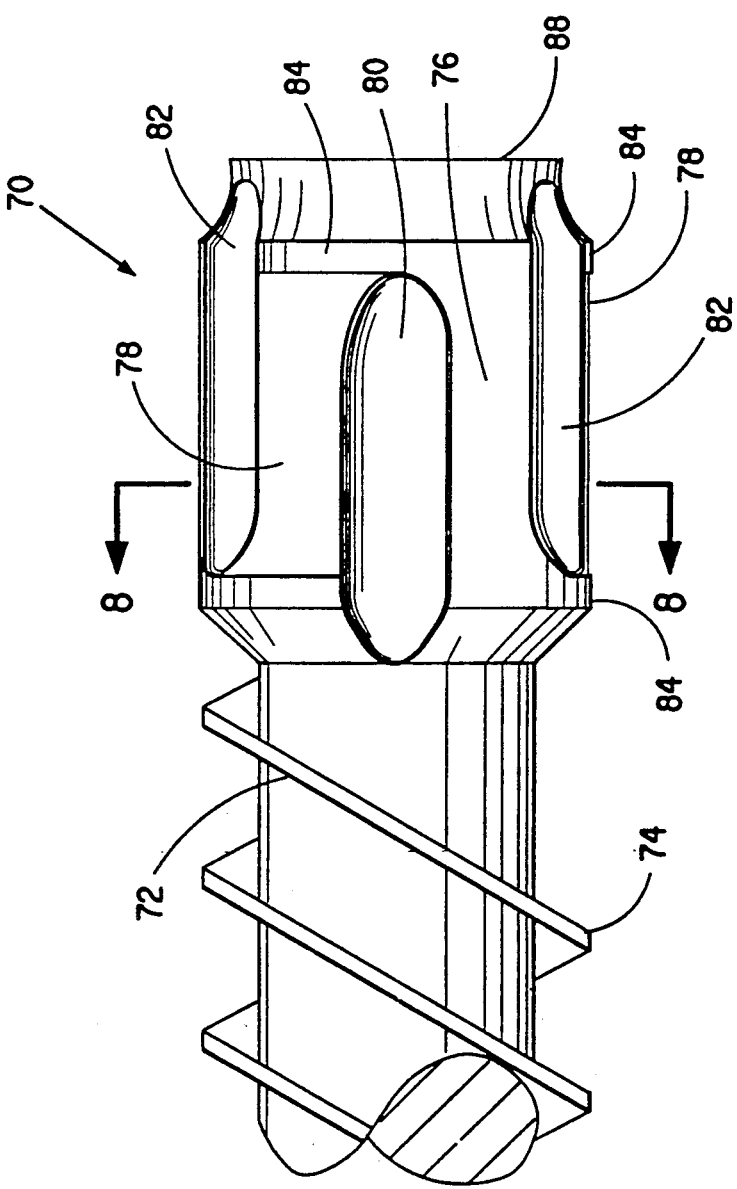
FIG. 7 shows in side elevation another embodiment of dispersive mixing section for a screw which can be used in an injection molding machine for carrying out the process of the present invention.

FIGS. 7 and 8 show another design of a dispersion head that can be used in the present invention. This head 70 forms the forward end of a screw 72 having a helical bearing flight 74 only partially shown, which can be the same as screw 12, with head 70 forming the dispersion section to take the place of dispersion section 18. Head 70 is commonly available as a Maddock head for use in mixing colorant into thermoplastic resin. It has a plurality of bearing flights 76 and barrier flights 78 interleaved with one another and separated by entrance channels 80 and exit channels 82. These function similar to the corresponding elements of dispersion section 18, except that in dispersion head 70, they are parallel to the axis of the screw 72 and therefore do not participate in the pumping action of the screw and each shear section 20 of dispersion section 18 has a greater number of flights and channels. In the embodiment shown in FIGS. 7 and 8, the spill clearance 86 is defined by the smaller radius of the barrier flights 78 as compared to the bearing flights 76 and the distance between the barrier flights and the interior wall of the barrel. Webs 84 extend from the bearing flights to close the exit end of the entrance channels and the entrance end of the exit channels and to define the sides of the spill clearance. The nose 88 of the dispersion head 70 can be equipped with a conventional check valve (not shown) so that the screw using this head can be used in injection molding involving reciprocation of the screw.

The foregoing description of apparatus for conducting the direct fabrication process of the present invention works admirably well for combining a wide variety of first and second resins which are incompatible with one another and of course is also operable for use on compatible resins.

In the case of the direct fabrication of polyester resin as the major component and ethylene/epoxide copolymer elastomer, the toughness result for the directly fabricated articles is not consistently optimum. Polyester resins, particularly polyethylene terephthalate, are moisture sensitive such that the presence of moisture during melt processing can cause molecular weight degradation, which adversely affects toughness. When the resin is post consumer waste obtained, e.g., from chopped-up bottles, whereby the resin is in the form of flakes, such flakes can be contaminated with impurities despite cleaning and separation treatment, which can also cause polymer degradation. For these or perhaps other causes, the practice of the direct fabrication process on polyester resin and epoxide copolymer elastomer can give inconsistent results.

One embodiment of the present invention solves this problem by providing much more consistently high toughness results for the directly fabricated articles from these polymers. It has been discovered that the toughening effect of the copolymer elastomer on the polyester resin can be enhanced by incorporation of adjuvant into the melt blend of these polymers. This incorporation can be carried out by adding the adjuvant to the melt blend, whereby the shearing of the melt blend disperses the adjuvant therein. Alternatively, the incorporation can be carried out by adding the adjuvant to the feed of polymer particles to the direct fabrication process. The adjuvant can be in the form of finely divided particulate material which can be dry mixed with the polymer particle feed. The adjuvant can also be normally liquid (at room temperature), which state lends itself to either mixing with the polymer particle or injection into the melt blend of the polymer. Preferably the adjuvant does not contain any water. When added in the dry form, the adjuvant needs to be dispersible in the polymer melt. Preferably, the adjuvant in the dry form has a melting point which is less than the temperature of the melt blend of polymers. The temperature of the melt blend will generally be at least 240° C. In any event, the adjuvant is preferably neat, i.e., without dilution in a liquid solvent or dispersant, so that such diluents do not have to be disposed of and will not interfere with the direct fabrication process. The shearing of the melt blend disperses the adjuvant therein so that preferably, it is no longer visible in the blend or in the articles fabricated therefrom, even under magnification of 1000×.

A number of compounds incorporated into the melt blend provides the adjuvant effect, i.e., the toughness of articles molded from the melt blend is high with much greater consistency than when the adjuvant is not present. Preferably the toughness of the articles molded in accordance with the embodiment of the present invention is at least 500 J/m and more preferably at least 700 J/m.

Examples of adjuvants include zinc salts and zinc complexes. Examples of zinc salts include the zinc salts of fatty acids which are saturated and have the general formula $CH_3(CH_2)_n COOH$ wherein n is 4 to 27, preferably 7 to 19. Examples of such zinc salts are zinc valerate, zinc octanoate, zinc laurate, and zinc stearate, with zinc stearate being preferred. Zinc octanoate is an example of normally liquid adjuvant, while zinc stearate is a solid at room temperature but melts at about 130° C. Examples of zinc complexes are zinc acetyl acetonate and zinc diethyldithiocarbonate.

Additional adjuvants include certain salts of certain other metals, including tin stearate, copper stearate and cerium stearate.

Just as a number of compounds provide the adjuvant effect, a number of compounds do not as will be detailed in the Examples. Stearic acid is not an adjuvant. The same is true for the Na, K, Li, Ca, Mg, Al, Co, and Ni stearates.

Zn salicylate is an adjuvant but zinc benzoate and zinc citrate are not. $ZnCO_3$ is an adjuvant but $ZnO$ is not.

Zinc acetate is not an adjuvant apparently because it is not dispersible in the melt blend, i.e., the zinc acetate end up as "clumps" thereof in articles molded from the melt blend.

The effect of the adjuvant on the toughness of articles molded from the melt blend of polyester resin and copolymer elastomer, as previously described is to provide more consistently high toughness results than without the adjuvant being present. Apparently, the adjuvant makes the direct fabrication process more "forgiving" insofar as being able to tolerate polymer degration, presence of impurities, and other variabilities in feed composition and processing conditions that would otherwise only give occasionally high toughness results. The reason for the adjuvant effect of more consistently high toughness is unknown, as is the reason why seemingly closely related compounds are not adjuvants. Apparently, however, the adjuvant aids in the reaction between the polyester resin and the copolymer elastomer.

The adjuvant effect for particular compounds may also depend on the amount of shear to which the melt blend incorporating the adjuvant is subjected. At low shear, characterized by a screw back pressure of only about 0.3 MPa, the adjuvant effect may not be obtained, but is obtained when screw back pressure is increased to increase shear time, or other measures to increase shear intensity are taken. Several adjuvants, especially zinc stearate provides good results even at low screw back pressure. In this case, the adjuvant provides a two fold effect to the direct fabrication process. First, the adjuvant increases the consistency of the direct fabrication result of high toughness for the polyester resin/epoxide copolymer elastomer combination. Second, the adjuvant also reduces the amount of shear that is necessary to achieve the fine dispersion of the copolymer elastomer within the polyester resin, and promotes interaction therebetween which produces adhesion between these polymers. This means, e.g., that the shear time may be reduced and fine dispersion and superior toughness results still obtained. One manner of reducing shear time is to reduce the back pressure on the melt processing screw, which is used in direct fabrication molding to increase shear time. This may also lead to shorter molding cycles.

The amount of adjuvant used will generally be about 0.05 to 2.0% based on the weight of the polyester resin plus the copolymer elastomer, and is preferably about 0.1 to 0.5 wt. % thereof.

The process of the present invention in its many embodiments is useful to directly fabricate a wide variety of articles such as containers for many different utilities. Normally the process of the present invention will be practiced by combining the first and second resins for the first time at the start of the practice of the process which ends up with directly fabricated articles of predetermined shape, either finished articles as in the case of injection molded articles or intermediates such as a tubular parison for subsequent blow molding into the finished article. This saves the fabricator the need and expense to undertake precompounding. It is contemplated, however, that the resin supplier may wish to provide the second resin, ordinarily the minor resin component, to the fabricator in the form of a concentrate in a first resin, within which the second resin may be the major or minor resin component, ultimately to end up as the minor resin component in the fabricated article. When the second resin is low melting and moisture sensitive, the concentrate with the higher melting first resin gives a more conveniently dryable combination of resins. The concentrate will generally be supplied as pellets containing both the first and second resin for combination with additional similar or identical first resin for feed to the direct fabrication process of the present invention. Typically, when this embodiment is used, the pellets containing both the first and second resins will constitute a minor proportion of the feed to the direct fabrication process, and more often, no greater than about 40% of the weight of the resin components of such feed. In accordance with the present invention, the fabricator then subjects the combination of concentrate particles with first resin particles to the melting/shearing process to produce the fine dispersion of second resin particles within the matrix of first resin hereinbefore described.

Examples of the present invention are presented hereinafter (parts and percents are by weight unless otherwise indicated).

EXAMPLES

Examples 1-6

The polyester compositions used in these Examples were as follows: (a) 42 lbs. (19.1 kg) of PET recycle soda bottle flake (about 6 to 9 mm in lateral dimension and 0.05 to 1 mm thick) which was vacuum dried 18 hours at 100° C., and (b) 8.3 lbs. (3.8 kg) of pellets (3.5 mm diameter, 3.5 mm long) of 76.75% by wt. ethylene/28% by wt. n-butyl acrylate/5.25% by wt. glycidyl methacrylate copolymer elastomer which was vacuum dried 18 hours at 40° C. These two components and 100 grams of tetra bismethylene-(3,5-dibutyl-4-hydroxyhydrocinnamate) methane, a hindered phenol antioxidant available as Irganox® 1010, were then drum tumbled in a 132.5 L. drum lined with a polyethylene bag and blanketed with nitrogen gas atmosphere for 20 minutes and then fed directly to a single-stage injection molding machine. The hopper of the injection molding machine was continuously blanketed with nitrogen.

The injection molding machine was a 6 ounce (0.17 kg), 125 ton (1.11 MN) machine containing a 4.44 cm diameter screw. The screw was the screw described in FIG. 3, except that the screw had four shearing sections 20, in which the clearance 56 was 0.15 mm (0.006 in.) and each dispersion section 18 had 6 barrier flights. The temperatures used were as follows: Barrel rear, 175° C.; barrel center, 260° C.; barrel front, 260° C.; nozzle, 260° C.; mold, 40° C. The screw speed was 100 rpm resulting in a shear rate of 1528 sec$^{-1}$, and the time for the screw retraction (rotation) was varied from about 10 seconds to 28 seconds by application of back pressure to the screw as compared to the usual back pressure 0.3 MPa used for molding PET resin. Each shot produced two 3.18 mm×1.27 mm×127 mm flex bars and one 3.18 mm×76.2 mm×127 mm plaque.

Figure 9:
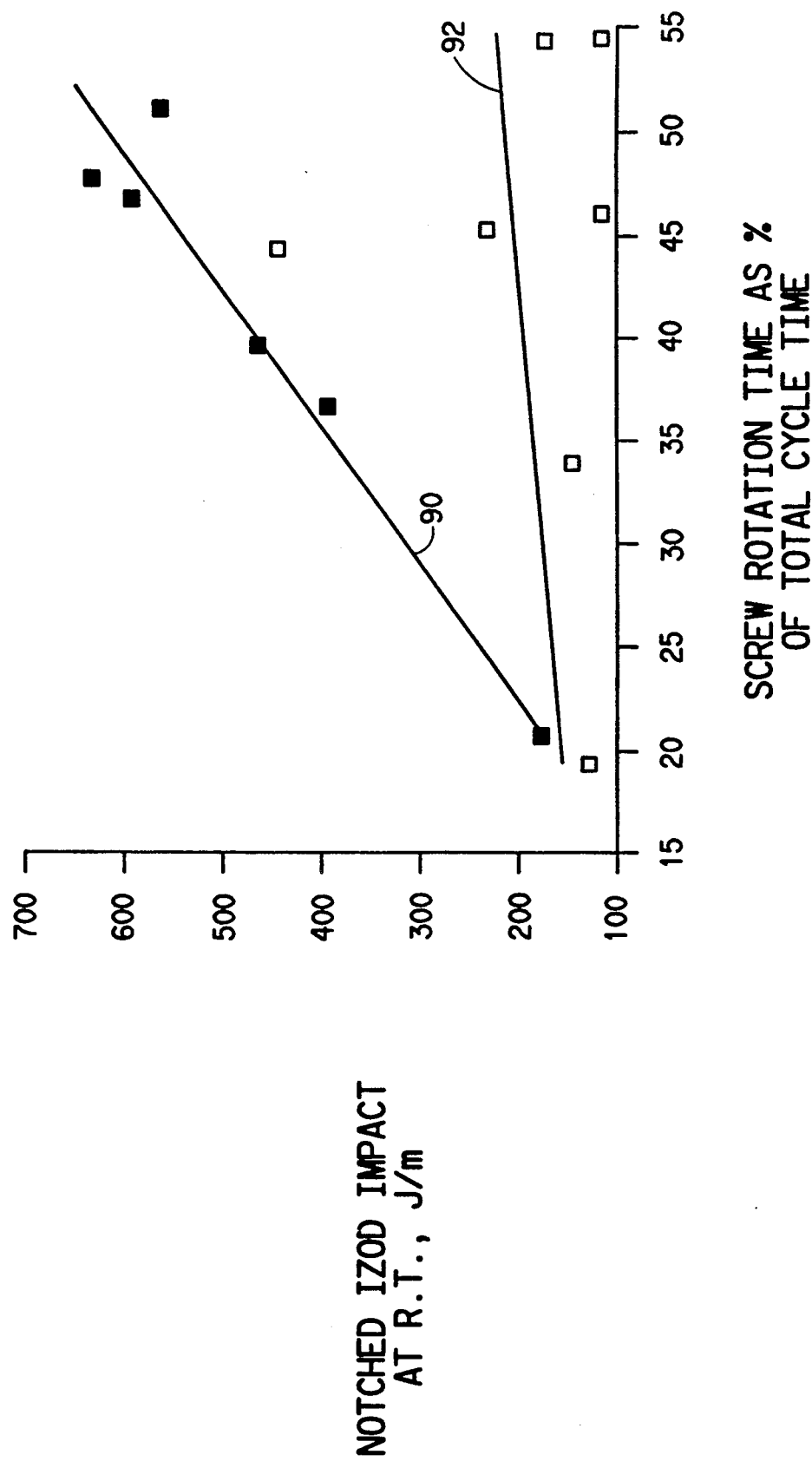
FIG. 9 shows a graph of impact strength vs. % shearing time for articles molded in accordance with the process of the present invention as compared to articles molded of the same resin by a conventional distributive mixing screw.

Table I shows further details of the operating conditions for each Example. The Notched Izod impact strength was measured for each Example on the flex bars produced by the 10th, 20th, 30th, 40th and 50th injection molding shots. The flex bars were cut in half, one half representing the gate end and the other half representing the far end of the injection molded flex bar. The test results were averaged to represent the result for each Example. These results are shown in Table I and are plotted as curve 90 in the graph of FIG. 9.

These results show in general the increase in toughness with increasing screw rotation time obtained by retarding the retraction of the screw. There was no discoloration present in the molded articles, indicating the absence of degradation. Such a small proportion of screw rotation time as compared to total cycle time was used for Example 1 that improved impact strength over the PET by itself was minimal. The impact strength of the PET resin by itself is generally less than 25 J/m. The number average particle size of the second resin within the PET resin matrix for the toughened molded samples was less than 1 micron.

Comparative Examples 7-13

The general molding procedure of Examples 1 to 6 was repeated, using the molding machine and same composition, except that the screw was a distributive mixing screw disclosed in U.S. Pat. No. 3,006,029, which had bearing flights in the mixing section, but no barrier flights. Further details of operation are obtained in the same manner as for Examples 1-6, except that for Example 8, flex bars molded only at II and plotted as curve 92 in FIG. 7.

TABLE I

| | SHEAR CONDITIONS FOR TOUGHENING OF PET | | | | |
|---|---|---|---|---|---|
| Example | Screw Back Pressure (MPa) | Screw Rotation Time (sec.) | Injection[1] Molding Cycle Times (fill/hold/eject) in sec. | Screw Rotation Time as % of Total Cycle Time | Average Notched Izod Impact Strength (J/m) |
| 1 | 0.3 | 9.0 | 20/20/3 | 20.9 | 177.8 |
| 2 | 2.0 | 15.0 | 15/25/3 | 36.7 | 393.0 |
| 3 | 2.1 | 17.0 | 20/20/3 | 39.5 | 455.5 |
| 4 | 2.9 | 20.5 | 15/25/3 | 47.7 | 632.8 |
| 5 | 2.6 | 22.0 | 15/25/3 | 51.2 | 567.6 |
| 6 | 3.1 | 25.0 | 20/30/3 | 47.2 | 591.1 |

[1]The times expressed for molding cycle are the fill/hold/and the eject times.

TABLE II

CONDITIONS OF OPERATION USING A MIXING SCREW WITH NO DISPERSION SECTION ON THE COMPOSITION OF EXAMPLES 1-6

| Comparative Example | Screw Back Pressure (MPa) | Screw Rotation Time (sec.) | Injection Molding Cycle Times (fill/hold/eject) in sec. | Screw Rotation Time as % of Total Cycle Time | Average Notched Izod Impact Strength (J/m) |
|---|---|---|---|---|---|
| 7 | 3.0 | 20.4 | 20/23/3 | 44.3 | 441.1 |
| 8 | 3.6 | 26.8 | 20/30/3 | 54.3 | 172.9 |
| 9 | 3.2 | 24.0 | 20/30/3 | 45.3 | 235.0 |
| 10 | 0.7 | 8.3 | 20/20/3 | 19.3 | 126.0 |
| 11 | 1.8 | 14.6 | 20/20/3 | 34.0 | 141.5 |
| 12 | 2.9 | 24.4 | 20/30/3 | 46.0 | 113.2 |
| 13 | 2.6 | 23.4 | 15/25/3 | 54.4 | 115.9 |

Comparison of curves 90 and 92 shows that as the % of screw rotation time increases, so does toughness, but the increase becomes much greater for a given screw rotation time using the screw with the dispersion section. The high average impact strength obtained for Example 7 is believed to be spurious, resulting from an almost 3× difference between impact strength of flex bars molded at the 10th shot vs. the 20th shot. The screw of U.S. Pat. No. 3,006,029 used for Comparative Examples 7-13 had no dispersion section. For the curve 90, the increased screw rotation time represents increasing shear time, while for curve 92, the increased screw rotation represents increased mixing time, with insufficient shear to obtain the fine dispersion of second resin within the first resin necessary to achieve high toughening.

Examples 14 and 15

The polyamide composition used in these examples was as follows: 81% by wt. nylon 66 which was vacuum dried; 10% by wt. ethylene/propylene/diene copolymer elastomer grafted with 1.8% maleic anhydride groups; and 9% by wt. ethylene/propylene/1,4-hexadiene copolymer elastomer. These components are available from Du Pont as Zytel ® 101, anhydride grafted E/P rubber and Nordel ® 3781, respectively. The three components were each in the form of pellets of about 3.5 mm in diameter ×3.5 mm in length and they were drum tumbled for 10 minutes under a nitrogen atmosphere and fed directly to the hopper of the injection molding machine used for Examples 1-6.

Moldings were produced on the injection molding machine using the following molding machine temperatures; barrel rear, 261° C., barrel center 281° C., barrel front 281° C., nozzle, 280° C., mold temperature 90° C. The screw used for this direct molding operation was the screw of FIG. 3, except that there were four shearing sections 20, used in Examples 1-6 operating at 100 rpm to produce a shear rate of 1528 sec$^{-1}$. The results are shown in Table III.

TABLE III

| | SHEAR CONDITIONS FOR TOUGHENING NYLON | | | | |
|---|---|---|---|---|---|
| Example | Screw Back Pressure (MPa) | Screw Rotation Time (sec.) | Injection Molding Cycle Times (fill/hold/eject) in sec. | Screw Rotation Time as % of Total Cycle Time | Average Notched Izod Impact Strength (J/m) |
| 14 | 2.1 | 15 | 20/25/3 | 32 | 421.4 |
| 15 | 2.4 | 24 | 20/25/3 | 50 | 1108.7 |

These results show that as screw rotation time increases, so does toughness of the molded article without causing discoloration to be present in the molded articles. The back pressure used in these Examples can be compared to the usual back pressure of 0.3 MPa used for injection molding nylon 66, and the notched Izod impact strength for nylon 66 by itself is generally no greater than 112.1 J/m even after conditioning to 50% R.H. The number average particle size of the second resins in the nylon was less than 1 micron.

When this experiment was repeated but using the distributive mixing screw of U.S. Pat. No. 3,006,029, and back pressures of 2.07 and 2.41 MPa were used to give screw rotation times of 11 and 25 secs, the impact strengths obtained were only 203 and 165 J/m, respectively.

Examples 16–22

A blend of 85% by wt. of PET recycle soda bottle flake with 15% by wt. of 3.5 mm pellets of Surlyn ® 8270 were drum tumbled as described for Examples 1–6, along with the antioxidant used in those Examples after vacuum drying of the PET flake. Surlyn ® 8270 is a zinc neutralized copolymer of ethylene/23.5% by wt. n-butyl acrylate/9% by wt. methacrylic acid and is an elastomer. The same injection molding machine and screw (FIG. 3, except there were four shearing sections 20,) as Examples 1–6 was used to mold samples from this dry blend of flake and pellets. The molding conditions used were as follows: Temperatures; barrel rear, 175° C.; barrel center, 260° C.; barrel front, 260° C.; nozzle, 260° C.; screw speed, 100 rpm; ram speed, fast; mold temperature, 40° C. The shear rate was 1528 sec$^{-1}$. Total injection molding cycle times of 43 seconds and 53 seconds were used with injection/hold times of 20/20 seconds and 20/30 second, respectively. Injection pressures of 3.5–5.5 MPa and a fast Ram speed were used to produce two 3.18 mm flex bars and one 3.18 mm plaque. Table IV shows the further operating conditions used and the toughness results. The notched Izod impact data is the average of 24 individual determinations. The different screw rotation times reported in Table IV were obtained by increasing back pressure on the rotating screw.

TABLE IV

SHEAR CONDITIONS FOR TOUGHENING PET WITH IONOMER

| Example | Screw Rotation Time (sec) | Total Molding Cycle Time (sec) | Screw Rotation Time as % of Total Cycle Time | Average Notched Izod Impact Strength (J/m) |
|---|---|---|---|---|
| 16 | 18.6 | 43 | 43.3 | 1244 |
| 17 | 12.4 | 43 | 28.8 | 582 |
| 18 | 25.2 | 53 | 47.5 | 1249 |
| 19 | 20.9 | 48 | 43.5 | 945 |
| 20 | 8.3 | 43 | 19.3 | 475 |
| 21 | 27.7 | 53 | 52.2 | 1185 |
| 22 | 17.3 | 43 | 40.2 | 1052 |

Since PET has a notched Izod impact strength of about 25 J/m, it is apparent from Table IV that considerable toughening of PET resin is obtained by the incorporation of this ionomer into the resin, with this toughening increasing with increasing shear time. In these Examples, the number average particle size of the ionomer in the PET matrix was about 1 micron.

Example 23

A two-stage injection molding machine, equipped with a reciprocating screw having the Maddock dispersion head of FIG. 7 and 8 was used to injection mold one liter flower pot type containers using a 4-cavity hot runner mold. The flower pot had a 1.2 mm thick wall and a 1.4 mm thick base. The feed to the injection molding machine consisted of a dry tumbled (under N$_2$ blanket) mixture of the following composition:

24.2 kg PET recycle soda bottle flake which had been vacuum dried for 16 hours a 100° C.

4.3 kg of 3.5 mm pellets ethylene/28% by wt. n-butyl acrylate/5.25% by wt. glycidyl methacrylate copolymer elastomer which had been vacuum dried for 16 hours at 40° C.

85 g of hindered phenol antioxidant (Irganox ® 1010)

The machine operating conditions were as follows: temperatures from rear to the forward of the extrusion barrel were 232° C., 249° C., 277° C. and 278° C., and 279° C. at the nozzle. The mold temperatures were 38° C. for the core and 51.7° C. for the cavity. The extruder was a 70 mm diameter 24/1 length to diameter ratio, equipped with a screw having a 3/1 compression ratio and the Maddock head. The Maddock head had a spill clearance of 0.635 mm and the screw operated at 125 rpm to give a shear rate of 651 sec$^{-1}$. The molding cycle was 18 sec.; the screw rotation time was only 3 sec.; giving a shear time of only 17% of the total cycle time.

The molded flower pot containers were tested for toughness by being filled with water and capped at room temperature and were dropped against a solid surface from a height of 122 cm. When the drop angle was 45° C., i.e., the filled container struck the surface at the corner between its wall and bottom, none of five containers tested failed (none broke). This test was repeated for the same containers molded the same way from the same composition, except the composition was pre-compounded, so that pellets of the mixed composition were fed to the 2-stage injection molding machine. Five of the containers were tested by the same drop test and all survived.

The drop test was repeated except that the drop angle was zero, i.e., the impact of the container on the solid surface was between the bottom of the container and the solid surface. In this test, none of the pre-compounded containers failed, while one of the five directly fabricated containers failed. This same result occurred when the room temperature water content of the containers was replaced by a glycol/water mixture at −18° C. and the containers were dropped at a 45° angle. When the containers with the cold glycol/water mixture were dropped flat (zero angle), one of the pre-compounded containers failed and two of the directly fabricated containers failed. These results show that direct fabrication produced a product which was about as tough as the same product produced by the more expensive route of pre-compounding.

Example 21

Example 23 was repeated except that the containers molded were a 2 gallon pail liner about 22.9 cm in diameter and 27.9 cm tall, having a 2.3 mm wall thickness and each weighing about 0.9 kg. The barrel temperatures were as follows: rear, 230° C.; center, 260° C; and forward 260° C. The nozzle temperature was 250° C., and the mold cavity and core temperature was 13° C.

The total molding cycle was 35.4 sec, of which the screw rotation time was 16 sec. The impact strength of the wall of the container was tested by the Gardner impact test (ASTM D-3029). At room temperature, the directly fabricated containers had a toughness of 55.1 J as compared to greater than 59.0 J for pre-compounded containers. At −20° C., the directly fabricated containers exhibited an impact strength of 24.4 J as compared to 35.3 J for the pre-compounded containers. Measurement of the particle size (of the ethylene elastomer) in the bottom of the pails revealed that for the directly fabricated pails the particle size range was 0.1 to 6.0 microns and the number average particle size was 0.6 micron. For the pre-compounded parts, the particle size range was 0.08 to 3.0 microns, and the number average particle size was 0.3 microns. From these results, it is apparent that direct fabrication produces a very fine dispersion of elastomer particles within the resin (PET) matrix, almost as fine as obtained through pre-compounding. It is believed that further experimentation, involving e.g., decreasing the spill clearance, will provide equally as good results as obtained by pre-compounding.

Example 25

In the experiments described under this Example, the procedure of Examples 1-6 was essentially repeated to prepare by direct fabrication and test the injection molded flex bars so fabricated. The same PET recycle flakes and ethylene/n-butyl acrylate/glycidyl copolymer elastomer in the same proportion were used in these experiments. These experiments, however, address the variability in toughness results obtained when the first and second resins are polyester, especially PET recycle flake, and the ethylene-glycidyl methacrylate copolymer elastomer, respectively. While fine dispersion of the second resin into the first resin is obtained by the direct fabrication process of the present invention, the toughness of the molded article is often deficient in comparison with the high toughness results obtained in some of the experiments, e.g., Examples 2-6. The cause of this variability may be due to impurities in the recycle PET coming from the post-consumer source of these flakes, variability in the PET flake itself because of the different sources of the PET resin from which the consumer plastic was originally made, insufficient drying of the PET flake before feeding to the direct fabrication process and/or a combination of these phenomena.

The embodiment of the present invention involving the use of adjuvants to improve the toughness result is shown in the series of experiments constituting this Example 25. The procedure for incorporating the adjuvant or comparison compounds into the molten blend of first and second resin was to add the adjuvant or comparison compound (collectively referred to herein as additive) in powder form unless otherwise indicated to the drum used for dry blending the resins together, whereby the additive was blended with the resins at the same time. The following experiments show the improved toughness result. In these experiments, the Izod impact test results reported represent the average of 12 to 20 impact tests, one half of which were done on gate ends of the molded flex bars and the other half of which were done on far ends of the flex bars. The notched Izod impact test results were all obtained at room temperature. The wt. % of adjuvant or comparison compound used is based on the weight of the PET flake plus copolymer elastomer.

(a) In this experiment, 0.25 wt. % of zinc stearate as the adjuvant was added to these resins. When the back pressure on the screw was 4.07 MPa to give a screw rotation time of 38.7% of the total cycle time (53 sec.), the notched Izod impact strength was 682.6 J/m. When the pressure was increased to 4.14 MPa to give a screw rotation time of 39.8% of the total cycle time (43 sec.), the notched Izod impact strength was 695.9 J/m. By way of comparison, in experiments done the same time and the same way, but in which the zinc compound was omitted, the following results were obtained: (1) back pressure of 2.07 MPa to give a screw rotation time of 39.3% of total cycle time of 43 sec., the notched Izod impact strength was only 87.0 J/m and (ii) back pressure of 2.97 MPa to give a screw rotation time of 49.8% of total cycle time of 53 sec., the notched Izod impact strength was only 77.4 J/m.

(b) In additional experiments, the effect of zinc stearate vs. calcium stearate, potassium stearate, and stearic acid as additives to the resin blend can be compared, as follows:

TABLE V

EFFECT OF VARIOUS COMPOUNDS ON BLEND TOUGHNESS

| Additive Wt. % | Screw Back Pressure (MPa) | Molding Cycle (Sec) | Screw Rotation Time As % Of Total Cycle Time | Average Notched Izod Impact Strength (J/m) |
| --- | --- | --- | --- | --- |
| None | 2.28 | 20/20/3 | 37.9 | 106.7 |
| None | 0.34 | 20/20/3 | 18.5 | 85.4 |
| None | 3.24 | 20/30/3 | 50.5 | 74.2 |
| Zn Stearate 0.25 | 3.10 | 20/20/3 | 37.0 | 971.3 |
| Zn Stearate 0.25 | 0.62 | 20/20/3 | 21.2 | 800.0 |
| Zn Stearate 0.25 | 4.83 | 20/30/3 | 50.9 | 613.8 |
| Ca Stearate 0.25 | 2.34 | 20/20/3 | 38.6 | 90.7 |
| Ca Stearate 0.25 | 0.34 | 20/20/3 | 19.1 | 85.4 |
| Ca Stearate 0.25 | 3.19 | 20/30/3 | 53.6 | 69.4 |
| K Stearate 0.25 | 2.97 | 20/30/3 | 51.9 | 80.1 |
| K Stearate 0.25 | 0.34 | 20/20/3 | 20.5 | 90.7 |
| K Stearate 0.25 | 2.03 | 20/20/3 | 40.0 | 74.7 |
| Stearic Acid 0.25 | 0.34 | 20/20/3 | 20.8 | 88.1 |
| Stearic Acid 0.25 | 2.00 | 20/20/3 | 39.8 | 80.1 |
| Stearic Acid 0.25 | 3.03 | 20/30/3 | 51.4 | 10.35 |

These experiments were conducted at the same time and in the same way. The directly fabricated articles containing the zinc stearate additive gave much improved toughness results as compared to when the other additives were used and no additive was used.

(c) In additional experiments, varying amounts of zinc stearate was used in the resin blends for comparison with blends made and tested at the same time in which no additive was present or when zinc acetate was the additive. Although these results reported in Table VI include some variability with the results when zinc stearate was used, the trend of clear superiority of the zinc-stearate containing blends in evident.

TABLE VI

| Additive Wt. % | Screw Back Pressure (MPa) | Molding Cycle (Sec) | Screw Rotation Time As % Of Total Cycle Time | Average Notched Izod Impact Strength (J/m) |
| --- | --- | --- | --- | --- |
| None | 2.07 | 20/20/3 | 41.3 | 95.0 |
| None | 0.41 | 20/20/3 | 20.2 | 89.1 |
| None | 1.38 | 20/20/3 | 29.1 | 87.5 |

TABLE VI-continued

| Additive Wt. % | Screw Back Pressure (MPa) | Molding Cycle (Sec) | Screw Rotation Time As % Of Total Cycle Time | Average Notched Izod Impact Strength (J/m) |
|---|---|---|---|---|
| None | 3.10 | 20/30/3 | 51.9 | 87.5 |
| Zn Stearate 0.50 | 4.83 | 25/30/3 | 42.2 | 1010.8 |
| Zn Stearate 0.25 | 3.51 | 20/20/3 | 41.9 | 995.4 |
| Zn Stearate 0.25 | 0.34 | 20/20/3 | 19.5 | 624.4 |
| Zn Stearate 0.25 | 1.93 | 20/20/3 | 28.8 | 717.8 |
| Zn Stearate 0.25 | 4.28 | 20/30/3 | 44.1 | 130.8 |
| Zn Stearate 0.10 | 2.72 | 20/20/3 | 38.6 | 614.8 |
| Zn Stearate 0.10 | 0.34 | 20/20/3 | 21.6 | 116.9 |
| Zn Stearate 0.10 | 1.86 | 20/20/3 | 30.95 | 139.8 |
| Zn Stearate 0.10 | 4.00 | 20/30/3 | 46.2 | 547.0 |
| Zn Acetate 0.07 | 2.83 | 20/20/3 | 42.8 | 79.5 |
| Zn Acetate 0.07 | 0.34 | 20/20/3 | 23.5 | 112.6 |
| Zn Acetate 0.07 | 1.45 | 20/20/3 | 29.1 | 109.9 |
| Zn Acetate 0.07 | 3.31 | 20/30/3 | 48.9 | 389.1 |

Greater amounts of zinc acetate could not be used because even at the 0.07 wt. % level, the zinc acetate could not be uniformly dispersed in the melt blend, as evidenced by the molded flex bars exhibited "spots" of the acetate additive, apparently arising from the non-dispersibility of the additive with the blend, despite the shearing of the blend in accordance with the present invention.

(d) In another series of experiments done at the same time, and in the same way, the effectiveness of zinc stearate is compared with other stearates in Table VII.

TABLE VII

| Additive Wt. % | Screw Back Pressure (MPa) | Molding Cycle (Sec) | Screw Rotation Time As % Of Total Cycle Time | Average Notched Izod Impact Strength (J/m) |
|---|---|---|---|---|
| None | 2.28 | 25/20/3 | 37.5 | 98.7 |
| None | 0.34 | 25/20/3 | 17.5 | 99.3 |
| None | 3.10 | 25/30/3 | 45.2 | 101.9 |
| Zn Stearate 0.25 | 3.24 | 25/20/3 | 36.0 | 989.5 |
| Zn Stearate 0.25 | 0.34 | 25/20/3 | 17.7 | 547.6 |
| Zn Stearate 0.25 | 4.48 | 25/30/3 | 47.8 | 968.7 |
| Mg Stearate 0.25 | 2.83 | 25/20/3 | 37.3 | 594.5 |
| Mg Stearate 0.25 | 0.34 | 25/20/3 | 16.5 | 112.6 |
| Mg Stearate 0.25 | 3.45 | 25/30/3 | 44.5 | 525.7 |
| Ca Stearate 0.25 | 2.59 | 25/20/3 | 36.9 | 92.9 |
| Ca Stearate 0.25 | 0.34 | 25/20/3 | 15.4 | 90.7 |
| Ca Stearate 0.25 | 4.00 | 25/20/3 | 47.4 | 135.0 |
| Al Stearate 0.25 | 2.76 | 25/20/3 | 36.5 | 567.3 |
| Al Stearate 0.25 | 0.34 | 25/20/3 | 16.0 | 103.5 |
| Al Stearate 0.25 | 4.00 | 25/20/3 | 44.0 | 587.1 |
| Li Stearate 0.25 | 1.97 | 25/20/3 | 36.9 | 146.2 |
| Li Stearate 0.25 | 0.34 | 25/20/3 | 16.3 | 90.7 |
| Li Stearate 0.25 | 2.90 | 25/30/3 | 44.7 | 132.7 |
| Na Stearate 0.25 | 2.59 | 25/20/3 | 37.1 | 86.5 |
| Na Stearate 0.25 | 0.34 | 25/20/3 | 15.6 | 88.8 |
| Na Stearate 0.25 | 3.45 | 25/30/3 | 44.8 | 108.9 |

Again the molded bars containing zinc stearate were far tougher than the bars containing no additive, about 8× tougher based on the average of the three toughness values (835 J/m) reported for the zinc stearate-containing bars. Averaging the results for the other additive-containing molded bars compares with the zinc stearate-containing bars as follows:

| Additive | Average Of The Three Notched Izod Impact Strength Values From Table VII (J/m) |
|---|---|
| Zn Stearate | 835 |
| Mg Stearate | 410 |
| Ca Stearate | 106 |
| Al Stearate | 419 |
| Li Stearate | 125 |
| Na Stearate | 94.5 |

This comparison reveals that the zinc additive gave about 2× improvement in toughness than the magnesium and aluminum additive and about 8× improvement than the remaining additives. The improvement of the zinc additive over the magnesium and aluminum additives was more pronounced at low screw back pressures (0.34 MPa), i.e., about 5× greater toughness.

(e) In still another series of experiments done at the same time, and in the same way, the effectiveness of zinc stearate is compared to metal salts of other fatty acids in Table VIII.

TABLE VIII

| Additive Wt. % | Screw Back Pressure (MPa) | Molding Cycle (Sec) | Screw Rotation Time As % Of Total Cycle Time | Average Notched Izod Impact Strength (J/m) |
|---|---|---|---|---|
| None | 2.28 | 20/20/3 | 39.3 | 65.1 |
| None | 0.34 | 20/20/3 | 19.1 | 68.3 |
| None | 3.03 | 25/25/3 | 45.9 | 66.2 |
| Zn Stearate 0.25 | 2.90 | 20/20/3 | 40.2 | 700.2 |
| Zn Stearate 0.25 | 0.34 | 20/20/3 | 19.3 | 221.3 |
| Zn Stearate 0.25 | 4.07 | 20/30/3 | 45.3 | 602.5 |
| Zn Montanate 0.25 | 2.62 | 20/20/3 | 40.7 | 87.5 |
| Zn Montanate 0.25 | 0.34 | 20/20/3 | 18.8 | 88.1 |
| Zn Montanate 0.25 | 4.00 | 25/30/3 | 43.6 | 353.3 |
| Ca Montanate 0.25 | 2.45 | 20/20/3 | 40.9 | 67.2 |
| Ca Montanate 0.25 | 0.34 | 20/20/3 | 17.0 | 73.7 |
| Ca Montanate 0.25 | 3.10 | 25/30/3 | 45.0 | 73.1 |
| Na Montanate 0.25 | 2.38 | 20/20/3 | 39.3 | 72.6 |
| Na Montanate 0.25 | 0.34 | 20/20/3 | 16.3 | 65.1 |
| Na Montanate 0.25 | 3.03 | 25/30/3 | 46.0 | 134.4 |
| Zn Laurate 0.25 | 2.76 | 20/20/3 | 42.1 | 818.7 |
| Zn Laurate 0.25 | 0.34 | 20/20/3 | 20.9 | 321.3 |
| Zn Laurate 0.25 | 3.59 | 25/20/3 | 49.1 | 336.2 |

Both the additive-free and the zinc stearate-containing molded bars exhibited lower toughness than shown in Table V, which is typical of results obtained for experiments done at different times. The significant feature is the fact that the zinc stearate-containing bars were about 7.6× tougher than the additive-free bars. The higher screw back pressure experiments gave about 9.7× improvement in toughness.

The average toughness for the zinc montanate-containing bars was 176.3 J/m which although less than the 535 J/m average for the zinc stearate-containing test bars still produced more than 2× improvement when no additive was present. Thus the 30 carbon atoms fatty acid zinc salt is not preferred. The 12 carbon atom-containing zinc salt (zinc laurate) gave great improvement, averaging 492 J/m. The calcium and sodium montanate additive-containing bars gave little to no improvement as compared to when no additive was present.

(f) In still another series of experiments done at the same time, and in the same way, the effectiveness of zinc stearate is compared to other zinc compounds in Table IX.

TABLE IX

| Additive Wt. % | Screw Back Pressure (MPa) | Molding Cycle (Sec) | Screw Rotation Time As % Of Total Cycle Time | Average Notched Izod Impact Strength (J/m) |
|---|---|---|---|---|
| None | 2.38 | 20/20/3 | 38.4 | 88.1 |
| None | 0.34 | 20/20/3 | 18.6 | 81.1 |
| None | 3.28 | 25/30/3 | 48.4 | 98.7 |
| Zn Stearate 0.25 | 3.52 | 20/20/3 | 38.4 | 968.7 |
| Zn Stearate 0.25 | 0.34 | 20/20/3 | 19.6 | 655.9 |
| Zn Stearate 0.25 | 5.24 | 25/30/3 | 48.4 | 889.1 |
| Zn Citrate 0.25 | 2.17 | 20/20/3 | 38.8 | 93.4 |
| Zn Citrate 0.25 | 0.34 | 20/20/3 | 19.3 | 79.0 |
| Zn Citrate 0.25 | 3.45 | 25/20/3 | 46.9 | 83.3 |
| Zn Acetyl-Acetonate 0.25 | 2.66 | 20/20/3 | 41.4 | 940.9 |
| Zn Acetyl-Acetonate 0.25 | 0.34 | 20/20/3 | 21.3 | 837.4 |
| Zn Acetyl-Acetonate 0.25 | 4.24 | 25/30/3 | 41.0 | 920.1 |
| Zn Diethyldithio-Carbonate 0.25 | 2.90 | 20/20/3 | 38.4 | 823.5 |
| Zn Diethyldithio-Carbonate 0.25 | 0.34 | 20/20/3 | 19.3 | 617.5 |
| Zn Diethyldithio-Carbonate 0.25 | 4.38 | 25/30/3 | 41.0 | 916.4 |

The zinc stearate-containing test bars were about 9× tougher than the bars containing no additive and the zinc citrate additive. The citrate additive contains 6 carbon atoms.

The remaining two zinc compounds reported in Table IX are zinc complexes. The toughness of the bars containing these complexes compared favorably with the results obtained for the zinc stearate-containing bars.

Example 26

In this example, Zn stearate is compared to articles molded from melt blends in which no adjuvant is present and with other compounds incorporated into the melt blends, some of which compounds act as adjuvants and some of which do not. The melt blend used in this series of experiments was derived from 85% by wt. of PET recycle soda bottle flake and 15% by wt. of the copolymer elastomer plus 0.5% Irganox ® 1010 antioxidant (based on the weight of the polymers). The adjuvant or comparison compound was mixed with the polymer feed to the injection molding machine. The injection molding of these specimens was essentially the same as in Examples 1-6 except that the flex bars used for testing were taken at the 5th, 10th, 15th, 20th and 25th injection molding "shots", each shot producing two flex bars. Impact testing was carried out on the gate end and far end of each bar, and the impact toughness results reported in Tables X and XI each represent the average of 20 impact tests.

Further details of these experiments are reported in Tables X and XI. In these tables, the variation in back pressure on the injection molding screw (same screw as used in Examples 1-6) is expressed in terms of % shear time, which is the % of the injection molding cycle during which the screw is rotating to shear the melt blend.

TABLE X

| ADDITIVE | WT. % | % SHEAR TIME | AVERAGE NOTCHED IZOD IMPACT STRENGTH J/m |
|---|---|---|---|
| NONE | — | 20.9 | 98.2 |
|  |  | 32.8 | 93.4 |
|  |  | 40.2 | 172.9 |
|  |  | 50.7 | 204.4 |
| ZN STEARATE | 0.25 | 20.2 | 841.1 |
|  |  | 37.9 | 1042.3 |
|  |  | 43.6 | 1010.8 |
| ZN OCTOATE | 0.14 | 19.5 | 765.9 |
|  |  | 37.7 | 972.4 |
|  |  | 42.8 | 999.1 |
| ZN CARBONATE | 0.125 | 23.3 | 243.4 |
|  |  | 40.7 | 673.0 |
|  |  | 50.0 | 821.9 |
| ZINC OXIDE | 0.05 | 23.5 | 90.7 |
|  |  | 40.9 | 84.3 |
|  |  | 50.6 | 93.9 |
| ZINC BENZOATE | 0.22 | 19.3 | 111.0 |
|  |  | 39.8 | 345.8 |
|  |  | 42.3 | 202.8 |
| ZN VALERATE | 0.19 | 20.2 | 149.4 |
|  |  | 37.0 | 1046.6 |
|  |  | 47.7 | 572.7 |
| ZN SALICYLATE | 0.20 | 21.2 | 478.2 |
|  |  | 40.5 | 1064.7 |
|  |  | 49.6 | 1034.8 |

These results show that Zn stearate, Zn octoate, Zn carbonate, Zn valerate, and Zn salicylate are effective as adjuvants, i.e., the articles molded from the melt blends incorporating these compounds gave high impact toughness results as compared to the situation when no additive was present. The mix time of about 20% represents a screw back pressure of about 0.3 MPa. For some of the adjuvants, the toughness result was minimal improvement at this minimum amount of shear time. For these adjuvants and others shown in Table X, the toughness generally increased with increasing shear time. Zn stearate produces a high level of toughness even at minimum shear time, with Zn octoate which is normally liquid, producing similar results. ZnO seems to have made the molded article weaker while Zn benzoate provides some improvement, but less than desired. In this experiment, the zinc octoate liquid was poured over the flake of PET and copolymer elastomer pellets in the wt. % indicated and then the zinc octoate was drum tumbled with these resins to obtain the blend, including antioxidant, for feed to the injection molding machine.

Table XI represents a second series of experiments which includes moldings with no additive and with Zn stearate for purposes of comparison with the other compounds tested as additives.

TABLE XI

| | WT. % | % SHEAR TIME | AVERAGE NOTCHED IZOD IMPACT STRENGTH J/m |
|---|---|---|---|
| NONE | — | 20.9 | 140.4 |
|  |  | 39.1 | 132.8 |
|  |  | 51.1 | 88.1 |
| ZN STEARATE | 0.25 | 21.2 | 504.9 |
|  |  | 37.9 | 861.9 |
|  |  | 41.5 | 590.8 |
| STANNOUS OCTOATE | 0.16 | 17.4 | 93.9 |
|  |  | 36.5 | 116.9 |

TABLE XI-continued

|  | WT. % | % SHEAR TIME | AVERAGE NOTCHED IZOD IMPACT STRENGTH J/m |
|---|---|---|---|
|  |  | 35.9 | 80.6 |
| STANNOUS STEARATE | 0.27 | 18.6 | 111.0 |
|  |  | 38.4 | 548.1 |
|  |  | 42.9 | 715.7 |
| COBALT STEARATE | 0.25 | 18.1 | 91.3 |
|  |  | 39.3 | 146.8 |
|  |  | 50.0 | 106.7 |
| NICKEL STEARATE | 0.25 | 18.6 | 72.0 |
|  |  | 39.8 | 78.5 |
|  |  | 48.1 | 81.1 |
| CERIUM STEARATE | 0.39 | 19.3 | 121.1 |
|  |  | 40.0 | 577.5 |
|  |  | 45.7 | 441.9 |
| COPPER STEARATE | 0.25 | 18.6 | 96.1 |
|  |  | 38.8 | 623.9 |
|  |  | 47.9 | 692.2 |

This table shows that Zn stearate, stannous stearate, cerium stearate, and copper stearate all act as adjuvants at certain shear times used to produce the molded articles. Stannous cobalt, and nickel stearate do not have the adjuvant effect. The level of toughness improvement for the experiment reported in this table is less than for Table X, which is typical of carrying out injection molding experiments in experimental equipment at different times and on feed polymers from different sources. Some degradation of just the polyester flake component, either present in the flake feed or caused by moisture present in the melt blend will typically lead to lower toughness values. Nevertheless, impact toughnesses greater than 500 J/m are attainable by all of the adjuvant-containing molded articles.

In all the experiments of Examples 25 and 26, experience indicates that the number average particle size of the copolymer elastomer in the polyester resin of the flex bars was less than one micron when the adjuvant which produced substantially increased toughness was used. The toughness improvement obtained when the screw back pressure was only about 0.3 MPa indicates this to be true even under these shear conditions.

As many widely different embodiments of this invention may be made without departing from the spirit and scope thereof, it is to be understood that this invention is not limited to the specific embodiments thereof except as defined in the appended claims.

What is claimed is:

1. A process for the direct fabrication of an article of pre-determined shape from incompatible resins comprising:
   a) combining particles of a first thermoplastic resin with particles of a second thermoplastic resin which is incompatible with said first resin, this incompatibility being characterized by a difference of at least 2 $(J/cm^3)^{\frac{1}{2}}$ between the solubility parameters of the first and second resins, said particles having at least one dimension of at least 2 mm, said first resin being present in a major proportion and said second resin being present in a minor proportion,
   b) melting this combination of particles while mixing them together,
   c) periodically shearing the resultant melt without degrading the resins therein to disperse the melt of the second resin within the melt of the first resin, the shear rate of this periodic shearing step being at least 300 sec$^{-1}$ and the shear rate and shear time being effective to result in a number average particle size of the second resin in articles fabricated from the result sheared melt of less than about .1 micron,
   d) directly injection molding or extrusion blow molding an amount of the resultant sheared melt into a pre-determined shape and obtaining as a result thereof said article of said pre-determined shape directly fabricated from said combined particles.

2. A process for direct fabrication of an article from incompatible thermoplastic resins, comprising
   a) feeding particles of a first thermoplastic resin into a molding machine,
   b) feeding particles of a second thermoplastic resin to said machine simultaneously with the feed of the first resin to said machine thereby obtaining a combination of particles, said second resin being incompatible with the first resin, this incompatibility being characterized by a difference of at least 2 $(J/cm^3)^{\frac{1}{2}}$ between the solubility parameters of the first and second resins, said particles of resin having at least one dimension which is at least 2 mm, a major proportion of said particles being of said second resin,
   c) melting the resultant combination of particles while mixing them together within said machine,
   d) shearing the resultant melt at a shear rate of at least 300 sec$^{-1}$ within said machine to disperse the melt of the second resin into the melt of the first resin, the melting and shearing steps being carried out by periodic rotation of a plasticating screw within a barrel operating on the resin feeds to the machine, the fine dispersion provided by the periodic rotation of the screw being characterized by a number average particle size of said second resin in the article fabricated from the sheared melt being less than about 1 micron, and
   e) either (I) forcing an amount of the resultant sheared melt into a pre-determined shape by the rotation of said screw to inject the sheared melt into a mold cavity of the machine, the amount of shear of the resultant melt during rotation of the screw being effective to finely disperse the second resin within the first resin, or (II) the rotation of said screw occurring during rotation of the screw within the barrel to fill the forward end of the barrel with the sheared melt, (i) retarding the retraction of the screw within the barrel so as to extend the shearing time without degrading said first and second resins, the combination of shear and extended shearing time being effective to finely disperse the second resin within the first resin, (ii) ramming the plasticating screw against the sheared melt filling the forward end of the barrel to inject the sheared melt into a mold cavity of the machine, and
   f) obtaining as a result thereof a directly fabricated article.

3. The process of claim 2 wherein the shearing time is at least 15% of the total molding cycle time.

4. The process of claim 2 wherein retardation of the retraction of the screw is accomplished by applying a back pressure of at lest 1.5 MPa to said screw.

5. A process for the direct fabrication of an article of pre-determined shape from incompatible resins comprising:
   a) combining particles of a first thermoplastic resin selected from the group consisting of polyester and polyamide resin with particles of a second thermoplastic resin which is an elastomer and is incompatible with said first resin, said particles having at least one dimension of at least 2 mm, said first resin being present in a major proportion and said second resin being present in a minor proportion,
   b) melting this combination of particles while mixing them together,
   c) periodically shearing the resultant melt at a shear rate of at least 300 sec$^{-1}$ to disperse the melt of the second resin within the melt of the first resin, the shear rate and shear time of this periodic shearing step being effective to result in a number particle size of the second resin in articles fabricated from the resultant sheared melt of less than about 1 micron,
   d) directly injection molding or extrusion blow molding an amount of the resultant sheared melt into a pre-determined shape and obtaining as a result thereof said article of said pre-determined shape directly fabricated from the combination of particles.

6. The process of claim 5 wherein the elastomer is selected from the group consisting of ethylene copolymer, styrene copolymer, and block copolyetherester.

7. The process of claim 5 wherein the impact strength of said articles is at least 300 J/m.

8. The process of claim 5 wherein the resin is recycle polyester resin flake.

9. The process of claim 8 wherein the shear rate is at least about 900 sec$^{-1}$.

10. The process of claim 8 wherein the proportions of said flake and said elastomer are about 80 to 90 wt. % and 10 to 20 wt. %, respectively.

11. A process for the direct fabrication of an article from a major proportion of polyester resin and minor proportion of ethylene/epoxide copolymer elastomer, said copolymer elastomer in combination with said polyester resin in said article providing substantial toughening of said article comprising:
   a) combining particles of said polyester resin with particles of said copolymer eslastomer, said particles having at least one dimension of at least 2 mm,
   b) melting this combination of particles while mixing them together,
   c) periodically shearing the resultant melt at a shear rate of at least 300 sec$^{-1}$ to finely disperse the melt of the copolymer elastomer within the melt of the polyester resin, and the shear rate and shear time being effective to result in a number average particle size of the copolymer elastomer in article fabricated from the resultant sheared melt of less than 1 micron, and said shearing being carried out in the presence of an effective amount of adjuvant for said toughening of said article said adjuvant having been incorporated into said melt, and
   d) directly injection molding or extrusion blow molding an amount of the resultant sheared melt into a pre-determined shape and obtaining as a result thereof said substantially toughened article of said pre-determined shape directly fabricated from said combined particles.

12. The process of claim 11 wherein said polyester resin is recycle flake.

13. The process of claim 1 wherein the epoxide of said copolymer elastomer is present as glycidyl(meth)acrylate.

14. The process of claim 11 wherein the amount of said adjuvant is 0.05 to 2.0 wt. % based on the weight of said polyester resin plus said copolymer elastomer.

15. The process of claim 11 wherein said adjuvant is at least one compound selected from the group consisting of zinc complexes, zinc salts of fatty acids having from 8 to 28 carbon atoms, Zn carbonate, Zn salicylate, tin stearate, copper stearate, and cerium stearate.

16. The process of claim 15 wherein said adjuvant is zinc stearate.

* * * * *